(12) United States Patent
Wang

(10) Patent No.: US 10,101,748 B2
(45) Date of Patent: *Oct. 16, 2018

(54) METHODS FOR LAUNCHING AND LANDING AN UNMANNED AERIAL VEHICLE

(71) Applicant: SZ DJI TECHNOLOGY CO., LTD, Shenzhen (CN)

(72) Inventor: Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,417

(22) Filed: May 30, 2017

(65) Prior Publication Data
US 2017/0315562 A1    Nov. 2, 2017

Related U.S. Application Data

(63) Continuation of application No. 14/236,305, filed as application No. PCT/CN2013/089443 on Dec. 13, 2013, now Pat. No. 9,696,725.

(51) Int. Cl.
| | | |
|---|---|---|
| *G05D 1/00* | (2006.01) | |
| *G05D 1/06* | (2006.01) | |
| *B64C 39/02* | (2006.01) | |
| *A63H 27/00* | (2006.01) | |
| *B64C 29/02* | (2006.01) | |

(52) U.S. Cl.
CPC .......... *G05D 1/0669* (2013.01); *A63H 27/12* (2013.01); *B64C 39/024* (2013.01); *G05D 1/0011* (2013.01); *G05D 1/0676* (2013.01); *B64C 2201/027* (2013.01); *B64C 2201/08* (2013.01)

(58) Field of Classification Search
CPC .. G05D 1/0669; G05D 1/0011; G05D 1/0676; A63H 27/12; B64C 39/024; B64C 2201/027
USPC ............................................. 701/2, 4, 11, 15
See application file for complete search history.

(56) References Cited

U.S. PATENT DOCUMENTS

| | | |
|---|---|---|
| 4,553,718 A | 11/1985 | Pinson |
| 5,324,223 A | 6/1994 | Yang |
| 5,716,032 A | 2/1998 | McIngvale |
| (Continued) | | |

FOREIGN PATENT DOCUMENTS

| | | |
|---|---|---|
| CN | 101332872 A | 12/2008 |
| CN | 101445156 A | 6/2009 |
| (Continued) | | |

OTHER PUBLICATIONS

European search report and opinion dated Jun. 1, 2016 for EP Application No. 13828971.5.

(Continued)

*Primary Examiner* — Tan Q Nguyen
(74) *Attorney, Agent, or Firm* — Anova Law Group, PLLC

(57) ABSTRACT

Methods and apparatus are provided for launching and landing unmanned aerial vehicles (UAVs) including multi-rotor aircrafts. The methods and apparatus disclosed herein utilize positional change of the UAV, visual signal, or other means to effect the launch or landing. The methods and apparatus disclosed herein are user friendly, particularly to amateur UAV users lacking practice of operating a UAV.

20 Claims, 16 Drawing Sheets

(56) References Cited

U.S. PATENT DOCUMENTS

| | | | |
|---|---|---|---|
| 7,410,125 B2 | 8/2008 | Steele | |
| 8,948,935 B1 * | 2/2015 | Peeters | B64C 39/024 701/3 |
| 9,696,725 B2 | 7/2017 | Wang | |
| 2006/0249623 A1 | 11/2006 | Steele | |
| 2007/0063096 A1 | 3/2007 | Tanabe et al. | |
| 2009/0222149 A1 | 9/2009 | Murray et al. | |
| 2009/0314883 A1 | 12/2009 | Arlton et al. | |
| 2011/0062278 A1 | 3/2011 | Ulrich et al. | |
| 2011/0147515 A1 | 6/2011 | Miller et al. | |
| 2012/0044710 A1 | 2/2012 | Jones | |
| 2013/0253733 A1 | 9/2013 | Lee et al. | |
| 2014/0252162 A1 | 9/2014 | Teller et al. | |
| 2014/0299708 A1 | 10/2014 | Green et al. | |
| 2015/0148988 A1 | 5/2015 | Fleck | |
| 2016/0009412 A1 | 1/2016 | Manasseh | |

FOREIGN PATENT DOCUMENTS

| | | | |
|---|---|---|---|
| CN | 102126553 A | 7/2011 | |
| CN | 102156480 A | 8/2011 | |
| CN | 103029834 A | 4/2013 | |
| FR | 2973256 A1 | 10/2012 | |
| JP | H01317896 A | 12/1989 | |
| JP | 2662111 B2 | 10/1997 | |
| JP | 2004268736 A | 9/2004 | |
| JP | 2005319970 A | 11/2005 | |
| JP | 2008207705 A | 9/2008 | |
| WO | WO-2013055265 A1 | 4/2013 | |
| WO | WO-2013105093 A1 | 7/2013 | |
| WO | 2013123944 A1 | 8/2013 | |

OTHER PUBLICATIONS

International search report and written opinion dated Aug. 25, 2014 for PCT/CN2013/089443.

Notice of allowance dated Mar. 15, 2017 for U.S. Appl. No. 14/236,305.

Notice of allowance dated May 5, 2017 for U.S. Appl. No. 14/236,305.

Office action dated Oct. 20, 2016 for U.S. Appl. No. 14/236,305.

* cited by examiner

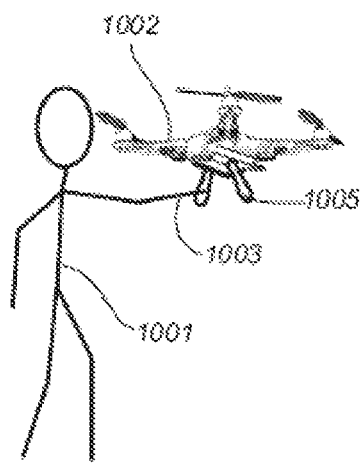
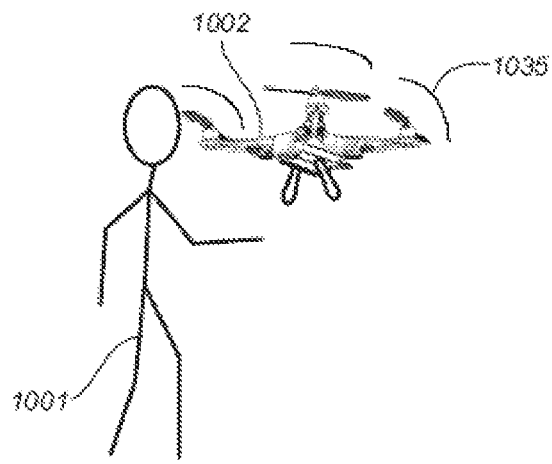
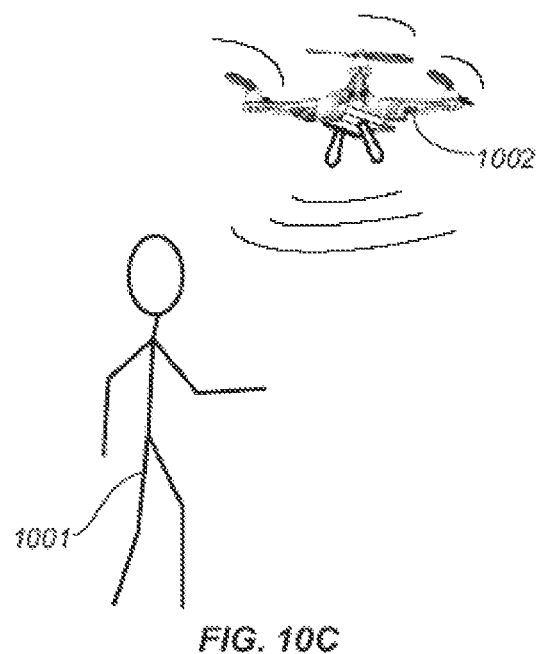
FIG. 10A
FIG. 10B
FIG. 10C

METHODS FOR LAUNCHING AND LANDING AN UNMANNED AERIAL VEHICLE

BACKGROUND OF THE INVENTION

For many years, both amateur and professional operators need to spend many hours of practice and training to master the control of unmanned aerial vehicles (UAVs) including multi-rotor aircraft. In particular, landing and takeoff remain the two most challenging aspects of operating a UAV. Such challenge is exacerbated when encountering uneven surfaces, strong wind, and other environmental factors affecting the operation of the UAV. Therefore, there exists a need for simplified or improved methods, as well as new designs of UAV that would render landing and takeoff easier even for amateur UAV users with little training or practice.

SUMMARY OF THE INVENTION

The present invention addresses this need and provides related advantages as well.

In one aspect, the present invention provides an alternative method of launching an unmanned aerial vehicle (UAV). In one embodiment, the method comprises (a) detecting a positional change of the UAV; and (b) in response to the detected positional change, activating the UAV to generate a lift and/or thrust.

In another embodiment, the present invention provides a method of launching an unmanned rotorcraft comprising a visual sensor and one or more rotor blades, said method comprising the steps of (a) detecting, by the rotorcraft, a visual signal generated by an operator of said rotorcraft; and (b) in response to the detected visual signal, activating the one or more rotor blades to generate a lift and/or thrust.

In yet another embodiment, the present invention provides a method for launching an unmanned rotorcraft comprising one or more rotor blades, at least one sensor being configured to detect release of a grip of said rotorcraft by a hand, the method comprising the steps of: (a) detecting by the sensor, the release of the grip by said hand; and (b) in response to the detected release of the grip, generating an activating signal to actuate the one or more rotor blades of the rotorcraft to generate a lift and/or thrust.

In practicing any of the disclosed methods, the detected positional change includes one member selected from the group consisting of a change in velocity, a change of acceleration, a change in orientation of the UAV, and a change in location with respect to a reference object. In some embodiments, the positional change is caused by detachment from a support supporting the UAV. Where desired, the support can be part of a mechanical body or a body of a living organism, including without limitation a human body (e.g., a human hand). In some embodiments, the positional change is detected by a visual sensor, an inertial sensor, a GPS receiver, a magnetometer, compass, or an altimeter. Where desired, the sensor can be on-board the UAV or off-board. In some embodiments, the sensor is a visual sensor including but not limited to a camera, located on-board or off-board. When choosing an off-board sensor, the sensor may be configured to communicate with a controller of the UAV to effect the activation of the UAV resulting in the lift and/or thrust.

In some embodiments, the detection of a visual signal can involve detecting a gesture or movement of a human body.

In some embodiments, detecting the release of the grip of the UAV by a hand (e.g., a mechanical or a human hand) results in one or more of: setting in motion in an arched trajectory, tossing into the air, catapulting into the air, and retracting or allowing said rotorcraft to fall towards the earth. The release can be effected by releasing any part of the UAV. Depending on the external structural component of the UAV, the release can involve the release of a hook, a rod, a rope, a bump, a hole, a landing leg, a structural extension, or a loop on the UAV. The detection of the release can be performed by one or more of the following sensors including without limitation, a touch sensor, a pressure sensor, a temperature sensor, a photosensor, and a magnet.

In practicing any of the subject methods for launching a UAV, the detected positional change, visual signal, and/or release of the grip to the UAV may trigger the activating the UAV resulting in a lift and/or thrust. In some embodiments, the lift and/or thrust is generated in less than about 60 seconds, 30 seconds, 10 seconds, 8 seconds, 6 seconds, 5 seconds, 4 seconds, 3 seconds, 2 seconds, 1 second, 0.5 second, 0.1 second, or even 0.01 second upon detecting the said detecting the positional change, visual signal, and/or release of the grip to the UAV. The activation of the UAV may involve activating one or more rotor blades of a UAV. In some embodiments, the activation of the UAV is performed when the UAV reaches a vertical velocity of zero. In some embodiments, upon generating the lift and/or thrust, the UAV hovers over a designated location.

In a separate but related aspect, the present invention provides alternative design of UAV.

In one embodiment, the present invention provides an unmanned rotorcraft comprising one or more rotor blades; a sensor configured to detect a positional change of the UAV; a controller configured to provide an actuating signal for activating the UAV in response to the detected positional change; and an actuator configured to cause the one or more rotor blades of the UAV to move and generate a lift and/or thrust in response to the actuating signal.

In another embodiment, the present invention provides an unmanned rotorcraft, comprising: a visual sensor configured to detect a visual signal generated by an operator of said rotorcraft; a controller configured to provide an actuating signal for activating the UAV in response to the detected visual signal; and an actuator configured to cause the UAV rotor blades to move and generate a lift and/or thrust in response to the actuating signal.

In yet another embodiment, the present invention provides an unmanned rotorcraft comprising one or more rotor blades, comprising: a sensor configured to detect release of a grip by a hand onto said an unmanned rotorcraft; a controller configured to provide an actuating signal for activating the UAV in response to the detected release; and an actuator configured to cause the UAV rotor blades to move and generate a lift and/or thrust in response to the actuating signal.

The UAV of any of the foregoing embodiments can be a rotorcraft including but not limited to the type with multiple rotor blades (multi-rotor aircraft).

The sensor of the foregoing UAV can be configured to detect a positional change of the UAV, a visual signal, and/or a release of the grip of the UAV by a hand. In some embodiments, a sensor for sensing the positional change is a visual sensor, an inertial sensor (including but not limited to a gyroscope and an accelerometer), a GPS receiver, a magnetometer, compass, or an altimeter. One or more of these types of sensors can be utilized, alone or collectively, to sense any one or combination of the following: a change in velocity, a change of acceleration, a change in orientation of the UAV, and a change in location with respect to a reference object. In some embodiments, the sensor is configured to sense a positional change caused by detachment from a support supporting the UAV. Where desired, the support can be part of a mechanical body or a body of a living organism, including without limitation a human body (e.g., a human hand). In some embodiments, the sensor is configured to detect a visual signal including but not limited to a gesture or movement of a human body. In some embodiments, the sensor can be on-board the UAV or off-board. In some embodiments, the sensor is a visual sensor including but not limited to a camera, located on-board or off-board. When choosing an off-board sensor, the sensor may be configured to communicate with a controller of the UAV to effect the activation of the UAV resulting in the lift and/or thrust.

In some embodiments, the sensor for detecting the release of the grip of the UAV by a hand (mechanical or human hand) is a touch sensor, a pressure sensor, a temperature sensor, or any combination thereof.

In some embodiments, the controller of the UAV is in communication with the sensor on- or off-board to provide an actuating signal for activating the UAV in response to the detected positional change and/or visual signal.

In some embodiments, the actuator includes without limitation a DC brushless motor, DC brush motor, and switched reluctance motor. In some embodiments, the actuator is configured to cause the one or more rotor blades to move and generate a lift and/or thrust in less than about 60 seconds, 30 seconds, 10 seconds, 8 seconds, 6 seconds, 5 seconds, 4 seconds, 3 seconds, 2 seconds, 1 second, 0.5 second, 0.1 second, or even 0.01 second, in response to the actuating signal, which is in turn generated when the positional change, visual signal, and/or release of the grip to the UAV is detected.

In another aspect, the present invention provides methods of decelerating a UAV. In some aspects, the present invention provides alternative methods of landing a UAV.

In one embodiment, a method of decelerating an unmanned aerial vehicle (UAV) comprises the steps of detecting by a sensor on the UAV, an external contact exerted upon said UAV while said UAV is airborne; and generating by said UAV a decelerating signal in response to the detected external contact, thereby decelerating said UAV. In some embodiments, the UAV comprises a holding member attached thereto. Such holding member can be a handle, rod, rope, a landing leg, a structural extension, a hook, a loop, or any structural component amendable to be held by a mechanical or human hand. In practicing the method, the external contact can be detected by a sensor selected from the group consisting of a touch sensor, pressure sensor, temperature sensor, photosensor, a magnet, or a combination thereof. For example, the sensor can be configured to detect the external contact exerted by way of capturing said holding member by a hand. Where desired, the method may further comprise determining that the UAV has been captured by a human hand for period of time that exceeds a predetermined threshold value and causing the UAV to come to a stop based on said determination.

In some embodiments, practicing this method utilizes a UAV that is a rotorcraft including one or more rotor blades, and said decelerating causes the one or more rotor blades to slow down, stall, or come to a complete stop. In some embodiments, the decelerating signal effects landing of said UAV at a designated location. The decelerating can include without limitation one or more of the following: causing a decrease in altitude of the UAV, causing a change in attitude of the UAV, causing a reduction in velocity of the UAV, and causing a negative change in acceleration of the UAV. In some instances, the decelerating signal is generated by a controller located in said UAV. In some instances, the decelerating signal is generated in less than about 60 seconds, 30 seconds, 10 seconds, 8 seconds, 6 seconds, 5 seconds, 4 seconds, 3 seconds, 2 seconds, 1 second, 0.5 second, 0.1 second, or even 0.01 second, 1 second from detecting said external contact.

The subject method of decelerating a UAV can be coupled with the step of detecting a positional change and generating a decelerating signal to the UAV in response to both the detected external contact and the positional change. Where desired, the positional change is selected from the group consisting of a change in velocity, a change of acceleration, a change in orientation of the UAV, and a change in location with respect to a reference object. Alternatively, the subject method of decelerating a UAV can further comprise the step of detecting a visual signal from a visual sensor (e.g., photosensor) and wherein said decelerating signal is generated based on both the detected capture and the detected visual signal.

In another embodiment, the present invention provides a method for landing an unmanned aerial vehicle (UAV), comprising: (a) detecting a positional change of the UAV while said UAV is airborne by the UAV; and (b) in response to the detected positional change, generating a deceleration signal to said UAV to bring said UAV to a stop.

In yet another embodiment, the present invention provides a method for landing an unmanned aerial vehicle (UAV), comprising: (a) detecting a visual signal of an operator of the UAV; and (b) in response to the detected visual signal, generating a deceleration signal to said UAV to bring said UAV to a stop.

In practicing the aforementioned method(s), the positional change is selected from the group consisting of a change in velocity, a change of acceleration, a change in orientation of the UAV, and a change in location of said UAV with respect to a reference object. The positional change can be caused by capturing the UAV in whole or in part by a mechanical or a human hand. The positional change can be detected by a visual sensor, an inertial sensor, a GPS receiver, a magnetometer, compass, or an altimeter.

The visual signal being detected includes but is not limited to a gesture or movement of a human body. Where desired, the visual signal can detected by a visual sensor (including but not limited to a camera) located on- or off-board the UAV. In some embodiments, the visual sensor is configured to be in communication with a controller of said UAV, said controller generating the deceleration signal to bring said UAV to a stop.

In some embodiments, the UAV is brought to a stop in less than about 60 seconds, 30 seconds, 10 seconds, 8 seconds, 6 seconds, 5 seconds, 4 seconds, 3 seconds, 2 seconds, 1 second, 0.5 second, 0.1 second, or even 0.01 second, from detecting said positional change or said visual signal.

In still yet another aspect, the present invention provides a UAV capable of performing one or more of the functions disclosed here. In one embodiment, the present invention provides a UAV, comprising a sensor configured to detect a positional change experienced by the UAV or a visual signal generated by an operator of the UAV; a controller configured to provide a deactivating signal for decelerating the UAV in response to the detected positional change and/or the visual signal; and an actuator configured to cause said UAV to decelerate in response to the deactivating signal. For detecting the positional change, the sensor can be a visual sensor, an inertial sensor, a GPS receiver, a magnetometer, compass, an altimeter, or a combination thereof. For detecting the visual signal (including but not limited to human gesture) can be any visual sensor. For example, any sensor capable of sensing light wavelengths within the visual range or infrared or ultra-violet range can be utilized. Where desired, the visual sensor is configured to be in communication with said controller to effect providing said deactivating signal for decelerating the UAV in response to the detected visual signal.

In some instances, the UAV is a rotorcraft including one or more rotor blades, and wherein said decelerating signal causes the one or more rotor blades to slow down, stall, or come to a complete stop.

Any structural components alone or in combination referenced in the subject methods can be utilized alone or in combination in the subject UAV disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 10A-C illustrate a method for launching a UAV, in accordance with an embodiment of the present invention.

DETAILED DESCRIPTION OF THE INVENTION

Figure 1:
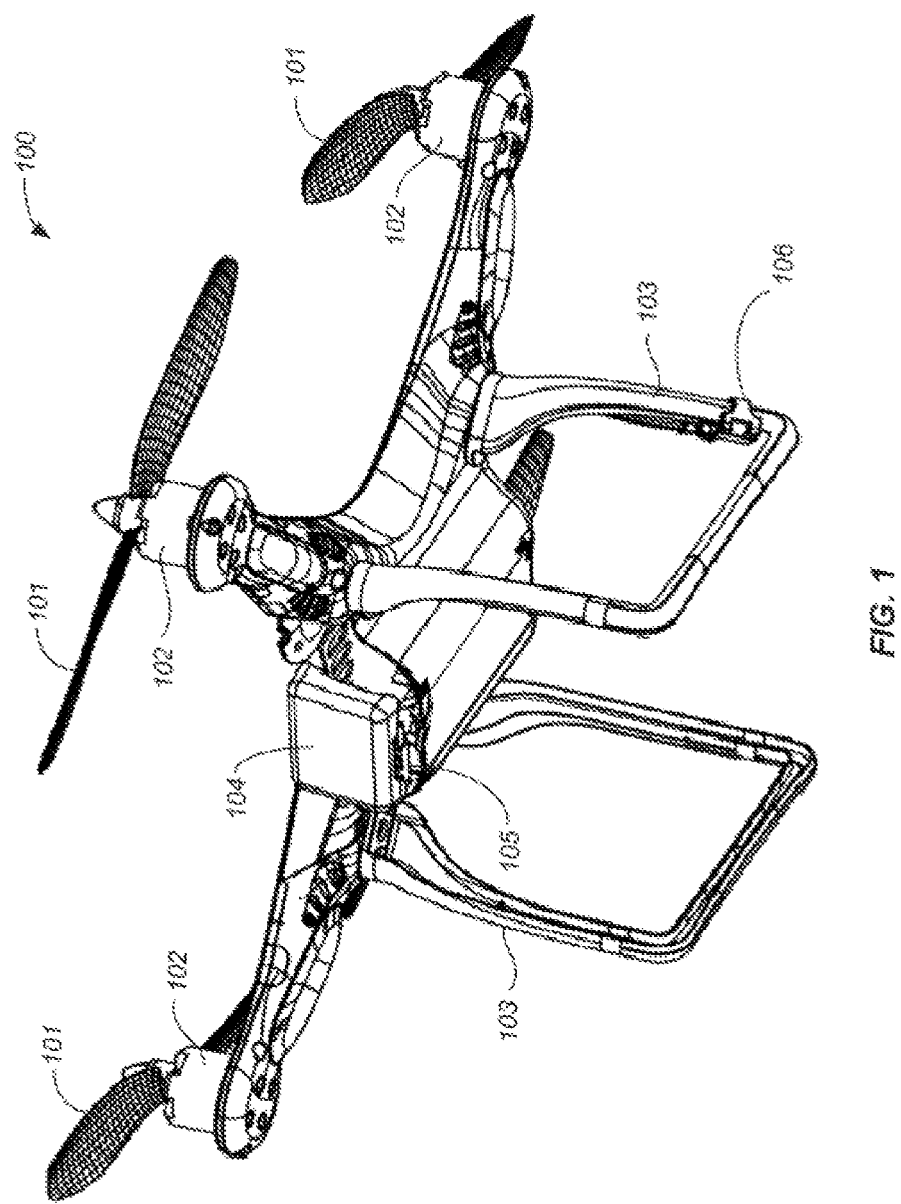
FIG. 1 illustrates an exemplary unmanned aerial vehicle (UAV) that may be used to implement the present invention, in accordance with an embodiment of the present invention.

The present invention provides methods and apparatus for launching and decelerating (encompassing also landing) unmanned aerial vehicle (UAV). According to an aspect of the present invention, simplified methods of launching the UAVs are provided. The subject methods are generally user friendly, designed for automatic launch by even armatures with little training on UAV operation, and thus improving user experience and accessibility. The subject methods can permit taking off and/or landing on uneven surface or rough terrain, thus also accommodating a wide range of environmental conditions conventionally unsuited for UAV operation.

Accordingly, in one embodiment, a method for launching an unmanned aerial vehicle (UAV), comprises the step of (a) detecting a positional change of the UAV; and (b) in response to the detected positional change, activating the UAV to generate a lift and/or thrust.

A positional change may include translational changes (e.g., in altitude, latitude and/or longitude) or rotational changes. A positional change may also include changes in the velocity, acceleration, and/or orientation of the UAV. A positional change may further include a change in location of the UAV with respect to a frame of reference or a reference object.

In some embodiments, the positional change or positional state may be detected by onboard and/or off-board sensors such as discussed herein. For example, the positional change may be detected by an inertial sensor, GPS receiver, compass, magnetometer, altimeter, proximity sensor (e.g., infrared sensor, LIDAR sensor), visual or image sensor (such as a camera or video camera), photo sensor, motion detector, and the like. For example, an onboard inertial sensor (including one or more gyroscopes and/or accelerometers) may be used to detect a change in acceleration and/or orientation experienced by the UAV. For example, the inertial sensor may be used to detect that the acceleration of the UAV is close to the gravity of the earth indicating that the UAV is experiencing the freefall motion. Similarly, the inertial sensor and/or visual sensor may be used to determine that the vertical velocity of the UAV is close to zero, indicating for example that the UAV is near the vertically highest point of the a parabola-like trajectory. Similarly, an onboard GPS receiver and/or visual sensor may be used to detect a change in the location of the UAV.

In some embodiments, detecting the positional change or positional state may include analyzing sensor data obtained from the sensors. Such analysis may be performed by a controller of the UAV, a computer or processor at a remote device or station. In some cases, obtained sensor data may be compared against a threshold and/or predetermined value. In such cases the UAV may utilize a variety of different sensors with built-in threshold limits. The threshold values may include absolute or relative values, depending on the specific positional change to be determined. For example, the threshold value may include the absolute or relative velocity, acceleration, orientation, location coordinates (e.g., altitude, latitude, and/or longitude), and the like. For example, a detected linear acceleration may be compared with the absolute value of g (gravity). As another example, the detected velocity may be compared with the absolute value of zero to determine if the velocity has reached zero, close to zero or has become negative (such as when the UAV has reached or passed the apex of a launching trajectory).

In some cases, instead of or in addition to comparing sensor data to threshold and/or predetermined values, the obtained sensor data may be compared with previously obtained sensor data. For example, frames of image data obtained from visual sensors may be compared and analyzed to determine changes in velocity and/or location of the UAV since last time the sensor data is obtained and/or the currently velocity and/or location of the UAV.

Based on the analysis of the sensor data, it may be determined whether the UAV should be activated, started or launched. Such determination may be performed by an onboard controller, a remote computer or processor, or a combination thereof. In response to the determination, an acceleration or activation signal may be generated, for example, by the onboard controller or a remote computer, to actuate one or more rotors of the UAV, thereby causing one or more rotor blades to rotate and generate a suitable lift for the UAV. The generated lift may be sufficient to allow the UAV to maintain an airborne state. In some embodiments, the generated lift allows the UAV to hover over a designated location. In some other embodiments, the generated lift allows the UAV to gain elevation. In yet some other embodiments, the generated lift may also allow the UAV to change its lateral position and/or orientation.

Figure 8:
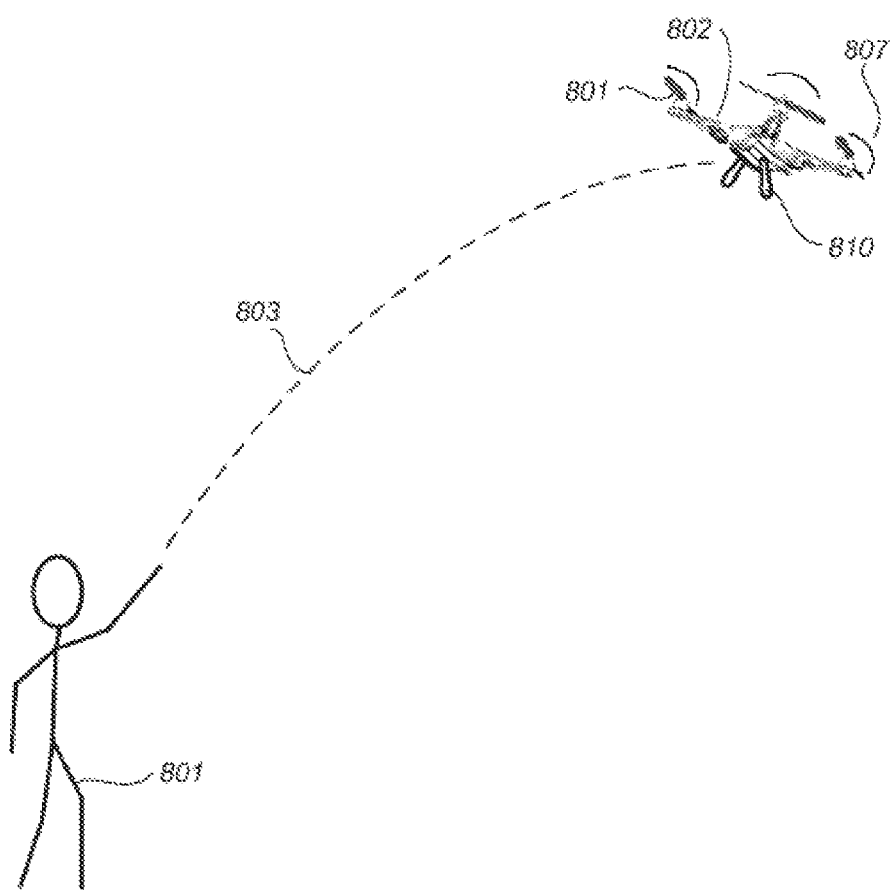
FIG. 8 illustrates another exemplary UAV that may be used to implement the present invention, in accordance with an embodiment of the present invention.

In some embodiments, the positional change or positional state may be caused directly by a human. FIG. 8 illustrates a method for launching a UAV, in accordance with an embodiment of the present invention. As illustrated, a person 801 throws or tosses a UAV 802 with non-rotating rotor blades into the air in an arc-like trajectory 803. At or near the peak of the trajectory 803, the vertical velocity of the UAV becomes zero or close to zero. Such zero or near-zero vertical velocity can be detected by an onboard or off-board sensor. In an embodiment, the zero or near-zero vertical velocity may be detected by an inertial sensor and/or visual sensor of the UAV 802. The sensor may provide the detected data to an onboard controller of the UAV or a remote controller, for example, via a wired or wireless link. The controller may determine, in response to the detected positional change or state, the suitable actuation signals to provide to one or more rotors of the UAV. The actuation signals may be generated by an onboard controller, a remote device or a combination thereof. The actuation signals may cause actuation of the one or more rotors, thereby causing rotation of respective rotor blades 801 to generate the desired lift 807 sufficient to cause the UAV to become autonomously airborne. For example, UAV may hover over the peak of the trajectory.

In an embodiment, instead of or in addition to the positional change of the UAV discussed above, the release of the UAV by a human hand may be detected.

Accordingly, in another embodiment, the present invention provides a method for launching an unmanned rotorcraft having (1) one or more rotor blades and (2) at least one sensor being configured to detect release of a grip of said rotorcraft by a hand. The method typically involves the steps of (a) detecting by a sensor on a UAV, the release of the grip by said hand; and (b) in response to the detected release of the grip, generating an activating signal to actuate the one or more rotor blades of the UAV to generate a lift and/or thrust.

By way of illustration, a UAV may be released by the person 801 of FIG. 8 via one or more holding members 810 such as discussed herein. The holding members may be provided with one or more sensors such as touch sensor, pressure sensor, temperature sensor and the like to detect the contact or the lack thereof with the holding members. In an embodiment, the release of the UAV from a mechanical or human hand may be detected by such sensors and in response to the detected release. In response to the detected release of the grip by a mechanical or human hand, an onboard or remote controller of the UAV then generate the actuation signals that cause the activation of the UAV as described herein.

In some embodiments, the actuation signals may be generated within less than about 1 second from the detecting step. In other embodiments, activating signal is generated within a range from as little as about 0.8 seconds, 0.5 seconds, 0.3 seconds, 0.1 seconds, 0.05 seconds, to about 0.001 second or less from the detecting step. In some instances, activating the one or more rotor blades to generate a lift and/or thrust is performed within less than about 1 second from the detecting step. In other embodiments, activating signal is generated within a range from as little as about 0.8 seconds, 0.5 seconds, 0.3 seconds, 0.1 seconds, 0.05 seconds, to about 0.001 second or less from the detecting step.

Figure 9A:
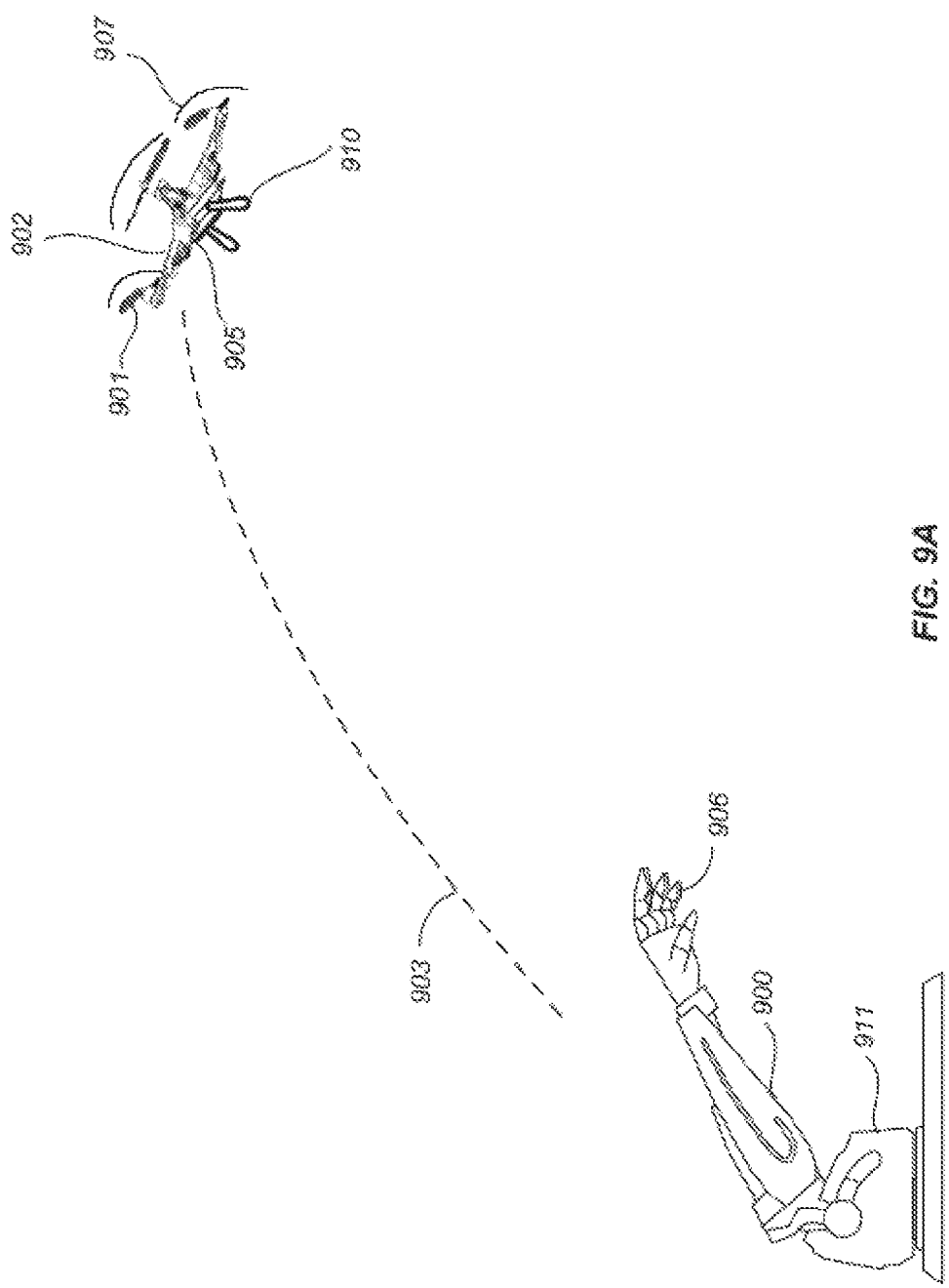
FIGS. 9A-B illustrate another exemplary UAV that may be used to implement the present invention, in accordance with an embodiment of the present invention.

In some embodiments, the positional change or positional state may be caused by a mechanical device. FIG. 9A illustrates an example mechanical device for launching an UAV, in accordance with an embodiment of the present invention. The mechanical device includes a mechanical arm 900 that comprises a mechanical hand 906 at one end and an actuator 911 at the other end. The mechanical hand 906 may be configured to hold and/or release a UAV 902. The actuator 911 may include a mechanical motor, electrical motor, spring assembly or any other suitable actuator. The actuator 911 may be controlled locally or remotely by a controller or computer. In an embodiment, the actuator 911 may cause the mechanical arm and/or hand to launch the UAV 902 into the air in a similar fashion as the launch by the human hand as discussed above in connection with FIG. 8. In some embodiments, the UAV may autonomously start or activate the rotors and rotor blades in response to detected positional change of the UAV and/or detected release of the UAV from the mechanical hand 906, similar to that discussed in connection with FIG. 8. For example, in response to the detection that the UAV has reached or is about to reach the peak of the trajectory 903 (e.g., detected vertical velocity is or is near zero), and/or the detection that the UAV has been released from the mechanical hand 906 (e.g., via a sensor on the holding member 910), an onboard controller of the UAV may cause one or more rotors to activate the corresponding rotor blades 901, thereby generating the desired lift and/or thrust 907 that causes the UAV to become autonomously airborne.

Additional methods for launching the UAVs are provided. FIGS. 10A-C illustrate another method for launching a UAV 1002, in accordance with an embodiment of the present invention. As illustrated by FIG. 10A, an UAV 1002 is initially held by a hand 1003 of a human 1001. In some embodiments, the UAV may be supported by a human body or a human hand. The UAV may be supported by one or more support members such landing stands or legs. Alternatively, the UAV may be placed directly on the human body or hand without any support members. In some other embodiments, the UAV may be held by the hand via one or more holding members 1005 such as discussed herein. In some embodiments, rather than being held or supported by a human hand, the UAV may be supported by any other object such as a removable hard surface. In a typical embodiment, when the UAV is thus held or supported, the rotors of the UAV are not actuated and the rotor blades are not moving.

To launch the UAV, as illustrated by FIG. 10B, the person may withdraw the support of the hand from the UAV or simply drop the UAV from an elevation position. In the cases where the person initially holds the UAV on the palm of a hand, the hand may be withdrawn from underneath the UAV. In the cases where the person initially holds the UAV via a holding member 1005, the holding members may be released, thus releasing the UAV. Regardless of how the UAV is released, acceleration of the UAV typically changes from zero or close to zero to around g (gravity of earth), thus experiencing freefall. Such a change of acceleration may be detected by the UAV, for example, by an inertial sensor. In some embodiments, instead of or in addition to sensing freefall, the UAV may also detect the release of the UAV, for example, by a contact sensor (e.g., touch sensor, pressure sensor, or temperature sensor). In response to the detected positional change and/or release of the UAV, the UAV may spontaneously and autonomously actuate the rotors (and corresponding rotor blades) to generate the desired lift and/or thrust 1035.

As illustrated in FIG. 10C, the desired lift and/or thrust 1035 may cause the UAV to hover over or gain elevation relative to the location where the UAV was originally held in FIG. 10A. In other embodiments, the post-release altitude of the UAV may be less than the original altitude. Regardless of the post-release position of the UAV, the UAV becomes airborne in an autonomous fashion (i.e., without external support).

In some embodiments, visual sensors may be used to detect external signals for launching the UAV. Accordingly, in a separate embodiment, a method for launching a UAV (including an unmanned rotorcraft) having a visual sensor and one or more rotor blades is provided, which method comprises the following steps: (a) detecting, by the rotorcraft, a visual signal generated by an operator of said rotorcraft; and (b) in response to the detected visual signal, activating the one or more rotor blades to generate a lift and/or thrust. As a variant to visual sensor, the method may involve an audio sensor configured to detect a sound signal which can be a command for launching the UAV.

A wide variety of visual sensors are useful for detecting the external signals for launching the UAV. For example, any visual sensor capable of detecting optical wavelengths within the visible spectrum of a naked eye, infra-red, or ultraviolet wavelength ranges, whether being polarized, high intensity light and/or other types of light wavelengths, are suited for practicing the subject methods. Where desired, the sensor can be a camera or video camera, placed on-board or off-board of the UAV. In some embodiments, some of the onboard sensors may transmit sensor data to an onboard controller, which in turn provides the sensor data to the remote controller. In some other embodiments, some of the onboard sensors may transmit the sensor data directly to the remote control device, e.g., as shown 1720 of FIG. 17. Various aspects of the sensing and controlling functionalities may be implemented by onboard systems, off-board systems, or a combination thereof.

Figure 13:
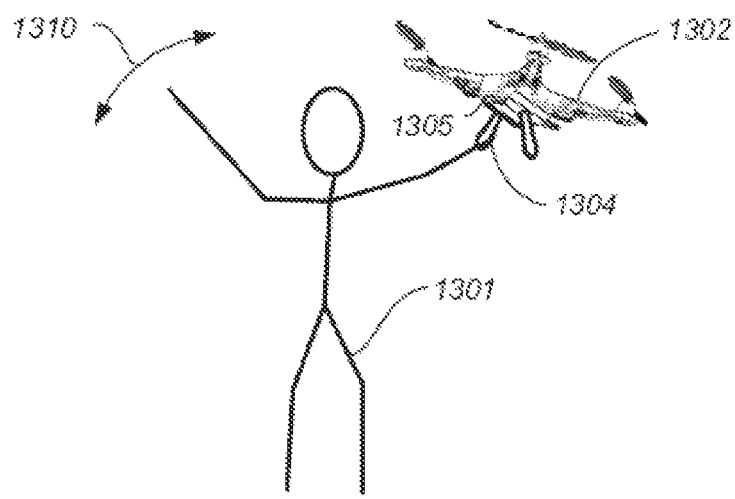
FIGS. 13-15 illustrate methods for launching or landing a UAV, in accordance with some embodiment of the present invention.
Figure 14:
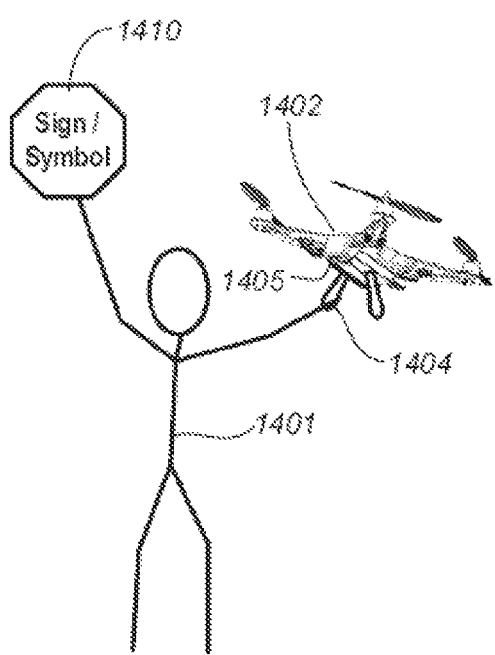
Figure 15:
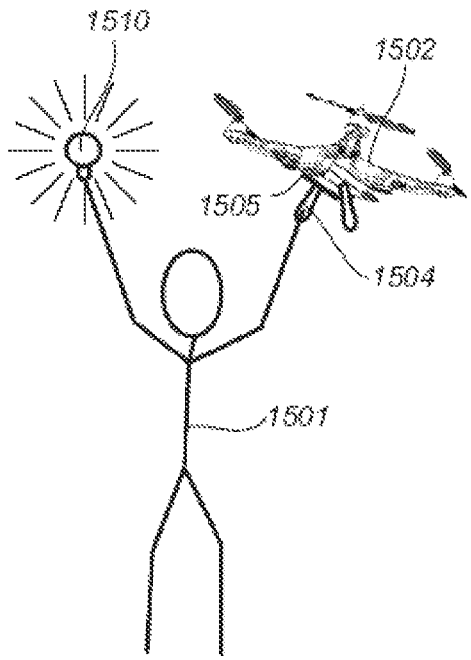

The external signal being detected can be a visual signal, a voice command, a gesture or movement of an object such as a body part. FIGS. 13-15 illustrate exemplary methods for launching the UAV, in accordance with this embodiment of the present invention. As illustrated in FIG. 13, a gesture 1310 may be detected by an onboard sensor 1305 and used to trigger the launching of the UAV such as discussed herein. The gesture may be made by any body part such as by a hand, arm, head, facial features, eye, and the like. For example, the gesture may include the wave of a hand or arm, the turn of the head, the movement of the eye, and the like. As illustrated by FIG. 14, a recognizable visual sign, symbol or pattern 1410 may be detected by the onboard sensor 1405 and used to trigger the launching of the UAV. Such predetermined visual sign, symbol or pattern may be of predetermined color, shape, dimension, size and the like. As illustrated in FIG. 15, light source 1510 may be detected by an onboard sensor 1505 and used to trigger the launching of the UAV such as discussed herein. The light source 1510 may include any light sources so as to provide RGB, UV, NUV, IR, polarized, high intensity light and/or other types of light. The light may be of various wavelengths and modulated in power over time.

The gesture or movement for launching the UAV may include throwing the UAV into the air, releasing or dropping the UAV from an elevated position, or providing predetermined external signals to the UAV, and the like. Such launching methods may be implemented by a human, mechanical device, or a combination thereof. In such examples, various on-board and/or off-board sensors may be used to detect positional changes of the UAV, or external signals (including but not limited to visual signals), or release of a grip of the UAV. Based on the detected changes or signals, an activating signal may be generated, for example, by the onboard controller or a remote computer, to actuate one or more rotors of the UAV, thereby causing one or more rotor blades to rotate and generate a suitable lift for the UAV.

The generated lift may be sufficient to allow the UAV to maintain an airborne state. In some embodiments, the generated lift allows the UAV to hover over a designated location. In some other embodiments, the generated lift allows the UAV to gain elevation. In yet some other embodiments, the generated lift may also allow the UAV to change its lateral position and/or orientation.

In a separate aspect, the present invention also provides simplified methods of decelerating a UAV, which can be readily adopted by a UAV user with little or no training on UAV operation. In some embodiments, the deceleration method can effect landing of a UAV at a designated location with little practice by the UAV user.

Accordingly, in one embodiment, the method of landing a UAV involves the steps of (a) detecting by a sensor on the UAV, an external contact exerted upon said UAV while said UAV is airborne; and (b) generating by said UAV a decelerating signal in response to the detected external contact, thereby decelerating said UAV.

The contact may be exerted while the UAV is airborne. The external contact may be detected by one or more onboard and/or off-board sensors such as touch sensor, pressure sensor, temperature sensor, photosensor, magnet, visual sensor, or a combination thereof. In response to the detected external contact, one or more decelerating or deactivation signals for causing the rotors to slow down or come to be complete stop. Such signals may be generated by an onboard controller or a remote device. In some embodiments, such signals may cause the UAV to land at a designated location.

In some embodiments, such external contact may be imposed by a human hand. The person may touch, grasp or otherwise hold a portion of the UAV (e.g., a holding member) while the UAV is airborne. For example, as the UAV hovers near or passes by a person, the person may reach out and get hold of the UAV by hand or by any other suitable device such as a hook, clasp, mechanical arm/hand, or the like. The UAV may detect such contact by an onboard sensor such as those described herein and autonomously slows down or stops the rotors (and hence rotor blades) of the UAV causing the UAV to decelerate or come to a stop.

Figure 9B:
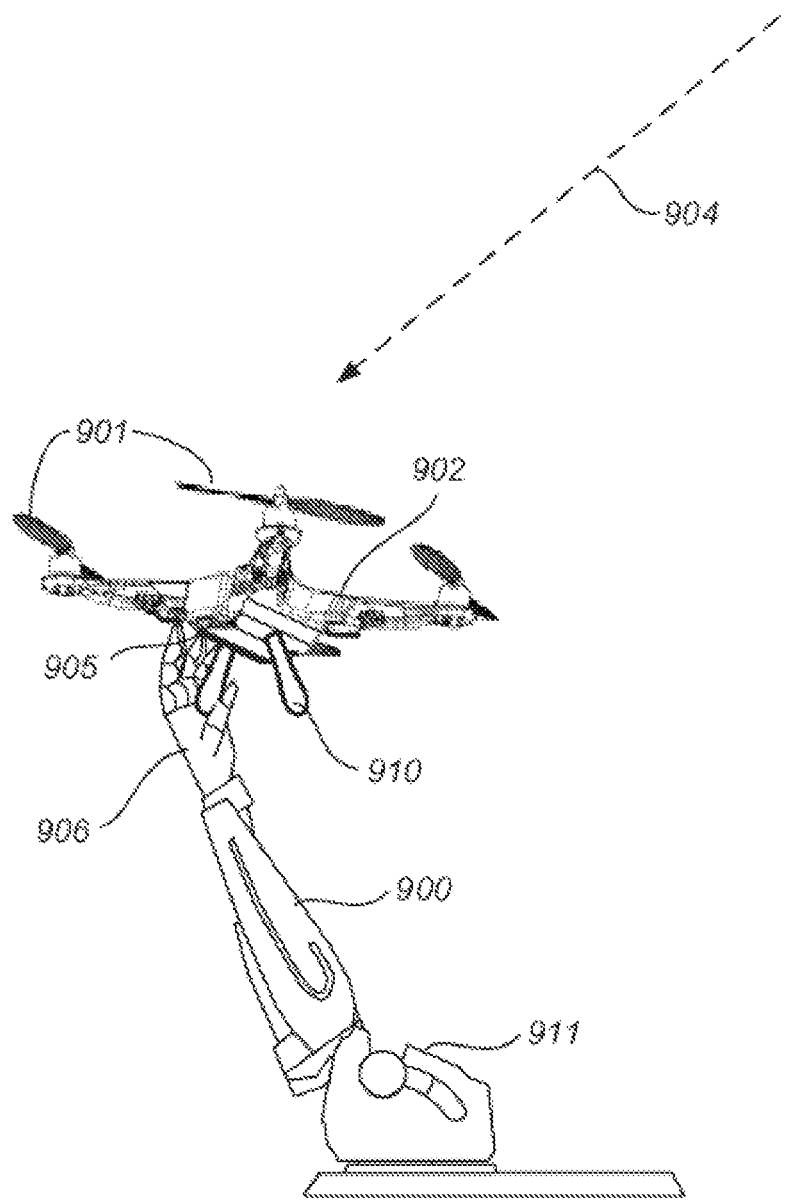

FIG. 9B illustrates an example mechanical device for landing an UAV, in accordance with an embodiment of the present invention. The mechanical device may be similar to that described in connection with FIG. 9A. For example, the mechanical device may include a mechanical arm 900, a mechanical hand 906 and an actuator 911. The actuator 911 may be configured to control the mechanical arm and/or mechanical hand to capture a UAV 902 that is within a predetermined range. For example, the mechanical hand may be controlled grasping or otherwise engaging with one or more holding members 910 of the UAV so as to capture the UAV. An onboard sensor 905 may be configured to detect the contact of the mechanical hand and as a result, autonomously slows down or stops the rotation of one or more rotor blades 901. In alternative embodiments, the UAV may be configured to detect contact with other external objects such as a landing surface (e.g., ground or table top) and slows down or stops the UAV in response.

Similarly, the UAV may be configured to detect the contact by a human hand. For example, an onboard temperature sensor may be configured to detect human body temperature on a holding member as a result of a holding of a human hand, thereby triggering the landing of the UAV. In some embodiments, other biometric sensors such as fingerprint sensors may be used to detect human contact.

In some embodiments, the decelerating or deactivation signals are generated only after the contact is sustained for a predetermined period of time. This may be useful for preventing the UAV from being shut down due to temporary and unintentional external contact. Similarly, in some embodiments, external contact may be used in combination with other sensor input such as positional changes and/or visual signals to determine whether to land the UAV.

In some embodiments, within less than about 1 second from detecting the external signal, the decelerating signal is generated. In other embodiments, decelerating signal is generated within a range from as little as about 0.8 seconds, 0.5 seconds, 0.3 seconds, 0.1 seconds, 0.05 seconds, to about 0.001 second or less from the point when the external signal is detected. In some instances, decelerating the UAV is performed within less than about 1 second from the point when the external signal is detected. In other embodiments, decelerating the UAV is performed within a range from as little as about 0.8 seconds, 0.5 seconds, 0.3 seconds, 0.1 seconds, 0.05 seconds, to about 0.001 second or less from the detecting step.

In some embodiments, positional changes may be used to trigger automatic landing of the UAV in addition to or instead of external contact with the UAV. Accordingly, the present invention provides a landing method is provided that involves the step of (a) detecting a positional change of the UAV while said UAV is airborne by the UAV; and (b) in response to the detected positional change and/or the visual signal, generating a deceleration signal to said UAV to bring said UAV to a stop.

Such positional changes may be similar to those discussed in connection with the launching of the UAV. For example, the positional change may include translational changes (e.g., in altitude, latitude and/or longitude) or rotational changes. The positional changes may include changes in the velocity, acceleration, and/or orientation of the UAV. The positional change may also include a change in location with respect to a frame of reference or a reference object. In various embodiments, the positional change may be detected by an inertial sensor, GPS receiver, compass, magnetometer, altimeter, infrared sensor, visual or image sensor (such as a camera or video camera), photo sensor, motion detector, and the like. In various embodiments, the positional change may be caused by a human or a mechanical device.

Figure 11A:
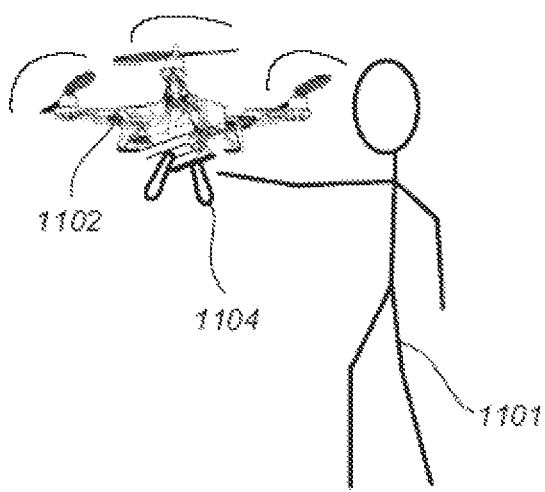
FIGS. 11A-B illustrate methods for landing a UAV, in accordance with some embodiments of the present invention.
Figure 11B:
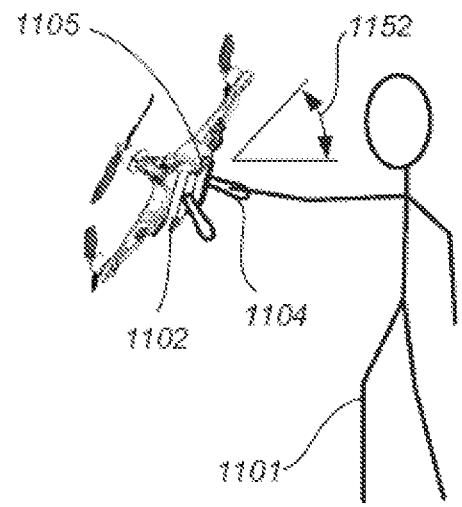
Figure 12:
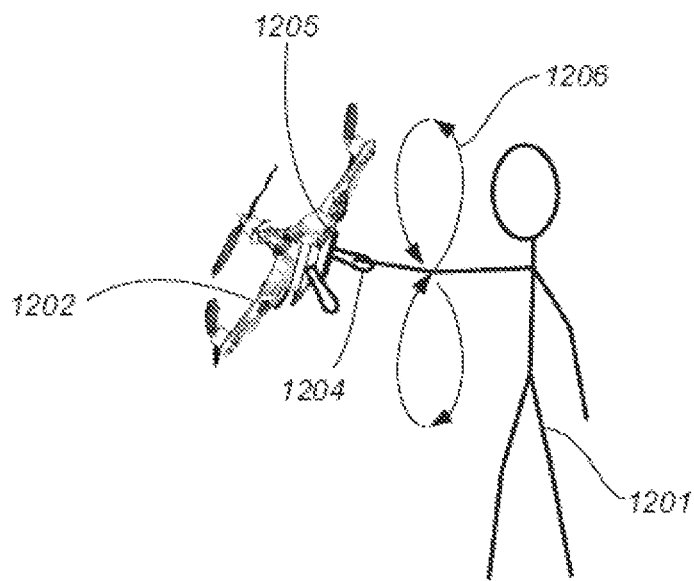
FIG. 12 illustrates a method for landing a UAV, in accordance with an embodiment of the present invention.

FIGS. 11A-B and 12 illustrates exemplary methods for landing an UAV, in accordance with some embodiments. As illustrated in FIG. 11A, an airborne UAV 1102 with rotating rotor blades is caught by a hand of a human 1101 via a holding member 1104 of the UAV. In some embodiments, the mere act of holding the holding member may cause the UAV to decelerate or stop. In some other embodiments, an additional positional change of the UAV is required besides holding of the UAV. Such an additional positional change may include a change in the orientation of the UAV such as by tilting or turning the UAV by a certain angle 1152 along a particular rotational axis. Such rotational changes may be detected, for example, by an inertial sensor or a visual sensor 1105 of the UAV.

In some embodiments, the positional change may include a sudden acceleration or deceleration caused by external forces (e.g., human). For example, while holding the UAV, the person may suddenly fling the UAV toward a certain direction causing a sudden acceleration of the UAV. Such acceleration or deceleration may be detected by an onboard sensor such an as an inertial sensor and used to trigger the deceleration of the UAV.

FIG. 12 illustrates another example of positional change of the UAV, in accordance with an embodiment of the present invention. As illustrated, the UAV 1202 is not only held by a human 1201 via a holding member 1204 but also moved in a predetermined pattern 1206 such as in a substantially circular pattern, from side to side, in a figure "8" pattern, or in any other suitable pattern. The movement pattern may be detected by one or more sensors described herein such as inertial sensors, visual sensors, motion sensors and the like. In some embodiments, the combination of the detected external contact and the detected positional change triggers the slowing down or stopping of the rotor blades of the UAV.

In some embodiments, external signals may be used to trigger the landing of the UAV in addition to or instead of the external contact and/or positional changes. Such external signals may include visual signals, audio signals, gesture signals or a combination thereof. In one embodiment, a subject landing method involves the steps of: (a) detecting a visual signal generated by an operator of said UAV; and (b) in response to the detected positional change and/or the visual signal, generating a deceleration signal to said UAV to bring said UAV to a stop.

For example, the methods discussed in connection with FIGS. 13-15 may be similarly used to land the UAV. As illustrated in FIG. 13, a gesture 1310 may be detected by an onboard sensor 1305 and used to trigger the landing of the UAV such as discussed herein. The gesture may be made by any body part such as by a hand, arm, head, facial features, eye, and the like. As illustrated by FIG. 14, a recognizable visual sign, symbol or pattern 1410 may be detected by the onboard sensor 1405 and used to trigger the landing of the UAV. Such predetermined visual sign, symbol or pattern may be of predetermined color, shape, dimension, size and the like. As illustrated in FIG. 15, light source 1510 may be detected by an onboard sensor 1505 and used to trigger the landing of the UAV such as discussed herein.

In various embodiments, the landing of the UAV may be triggered by the external contact, positional change, external signal, any other sensing mechanisms or any combination thereof. For example, as illustrated in FIGS. 13-15, the external signals are used in conjunction with detected external contact with the UAV (e.g., the holding of the holding member 1304, 1404 or 1504 of FIG. 13, 14 or 15, respectively) to cause the landing of the UAV. As illustrated in FIGS. 11-12, positional changes are used in conjunction with external contact to trigger the landing of the UAV. In some other embodiments, positional changes may be used in combination with external signals to trigger the landing of the UAV. In some other embodiments, external contact, positional changes and external signals may be used together to trigger the landing of the UAV.

In various embodiments, the sensors and the controllers may be located onboard and/or off-board the UAV. For example, in an embodiment, both the sensors and the controllers are located onboard the UAV. In another embodiment, both the sensors and the controllers can be located off-board the UAV. In some embodiments, some sensors are located onboard the UAV while the other sensors are located off-board the UAV. In another embodiment, some controllers are located onboard the UAV while the other controllers are located off-board the UAV.

The subject launching and decelerating methods can be implemented by a wide range of UAVs. The subject UAVs exhibit one or more unique features as described herein.

In one embodiment, the present invention provides an unmanned aerial vehicle (UAV), comprising: (a) one or more rotor blades; (b) a sensor configured to detect (1) a positional change of the UAV, (2) a visual signal generated by an operator of said UAV, or (3) release of a grip by a hand onto said UAV; (c) a controller configured to provide an actuating signal for activating the UAV in response to the detected positional change or a visual signal; and (d) an actuator configured to cause the one or more rotor blades to move and generate a lift and/or thrust in response to the actuating signal or the visual signal.

In another embodiment, the present invention provides an unmanned aerial vehicle (UAV), comprising: a sensor configured to detect a positional change experienced by the UAV and/or a visual signal generated by an operator of said UAV; a controller configured to provide a deactivating signal for decelerating the UAV in response to the detected positional change and/or the visual signal; and an actuator configured to cause said UAV to decelerate in response to the deactivating signal.

Figure 16:
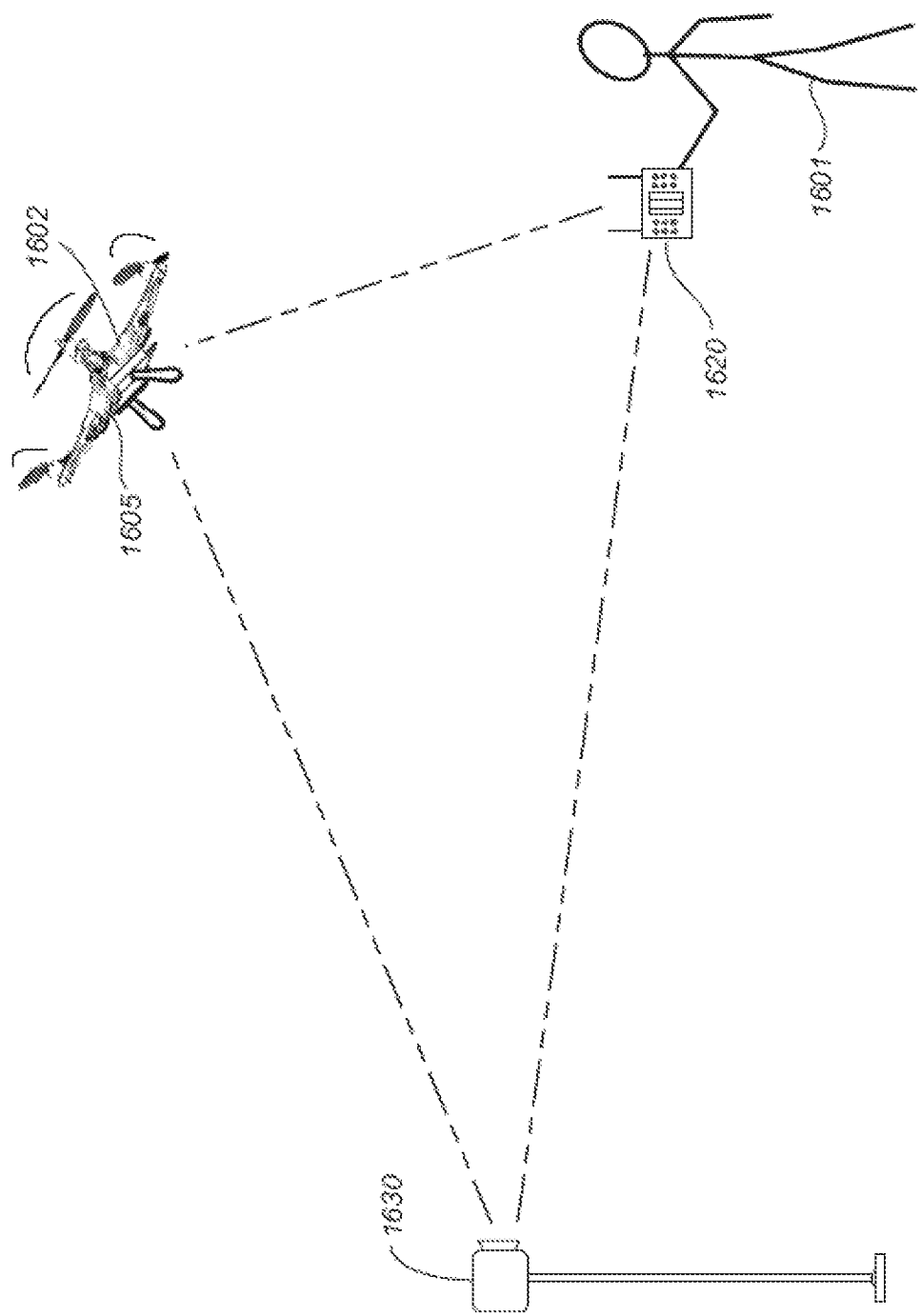
FIG. 16 illustrates an exemplary setup utilizing a UAV for implementing the present invention, in accordance with an embodiment.

The present invention further provides a system for implementing a method of launching or decelerating a UAV disclosed here. FIG. 16 illustrates an exemplary setup. A remote control device 1620, operated by an operator 1601, is in wireless communication with both onboard sensors 1605 of the UAV 1602 and an off-board sensing system 1630. The off-board sensing system 1630 may include one or more sensors mounted on external structures (fixed or movable) such as a pole, a building, a vehicle, a human or animal, and the like.

In some embodiments, sensor data from the off-board sensing system and/or the onboard sensors may be provided to a remote or off-board controller which may be implemented by the remote control device 1620, remote computer (such as in a base station) or processor, or the like. The remote controller may determine whether to trigger automatic launching or landing of the UAV and may provide the corresponding commands or signals to the UAV as a result. In some other embodiments, sensor data from the off-board sensing system and/or the onboard sensors may be provided to an onboard controller instead of or in addition to the remote controller. In various embodiments, aspects of the controller functionalities discussed herein may be implemented by onboard controllers, off-board controllers or a combination thereof. In some embodiments, autonomous landing is implemented by off-board controllers whereas autonomous launching is implemented by on-board controllers. In some other embodiments, autonomous launching is implemented by off-board controllers whereas autonomous landing is implemented by on-board controllers. In some other embodiments, both autonomous launching and landing are implemented by the onboard controllers. In some other embodiments, both autonomous launching and landing are implemented by the off-board controllers.

Figure 17:
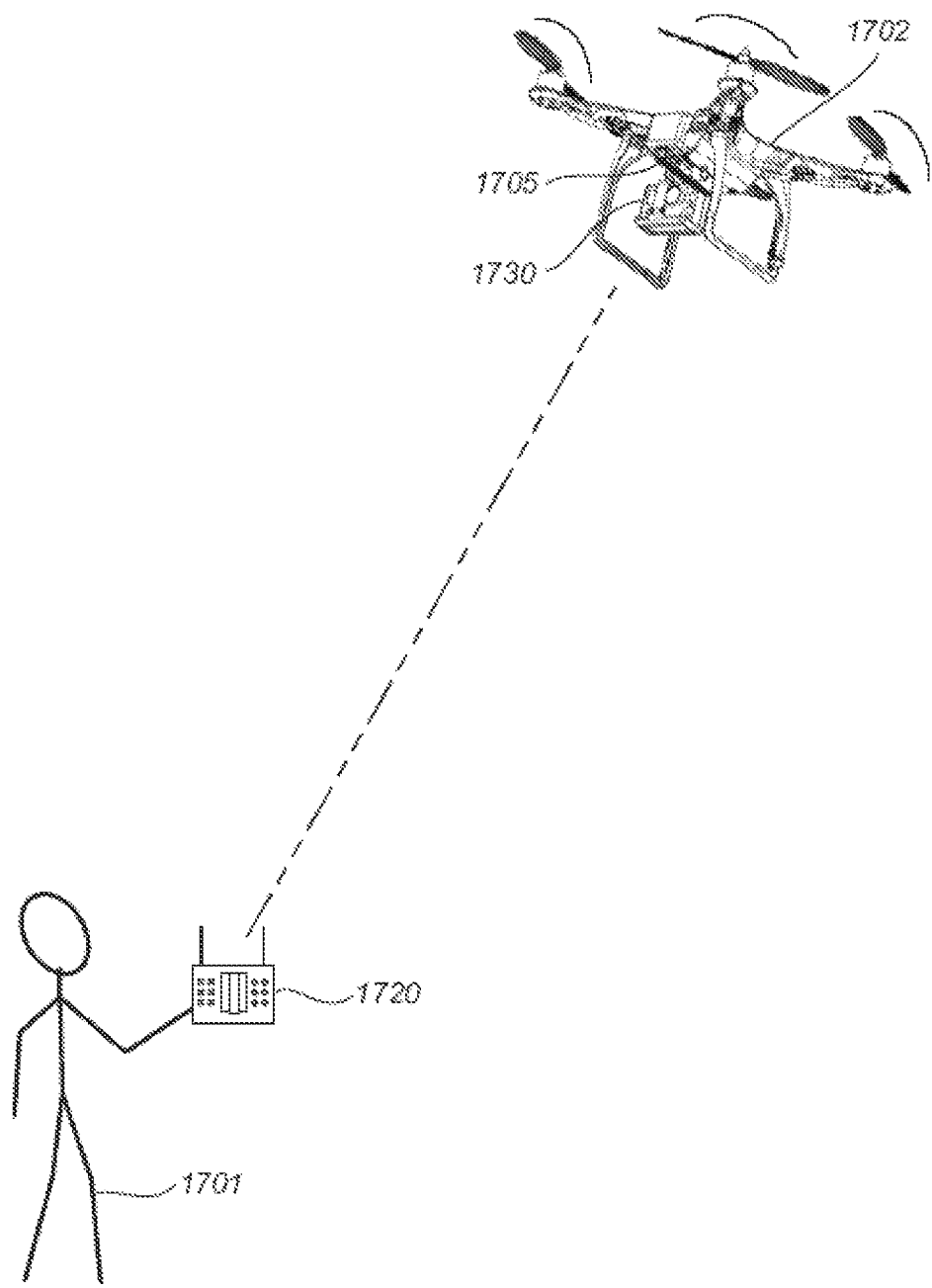
FIG. 17 illustrates an exemplary setup utilizing a UAV for implementing the present invention, in accordance with an embodiment.

FIG. 17 illustrates another exemplary setup for implementing the present invention, in accordance with an embodiment. As illustrated, remote control device 1720, operated by an operator 1701, is in wireless communication with various onboard sensors 1705 and 1730 of the UAV 1702. For example, the sensor 1705 may be a positional sensor such as an inertial sensor, GPS receiver, magnetometer, or the like. The sensor 1730 may be a visual sensor such as a camera or video camera. In some embodiments, some of the onboard sensors may transmit sensor data to an onboard controller, which in turn provides the sensor data to the remote controller. In some other embodiments, some of the onboard sensors may transmit the sensor data directly to the remote control device 1720. As discussed above, various aspects of the sensing and controlling functionalities may be implemented by onboard systems, off-board systems, or a combination thereof.

Figure 18:
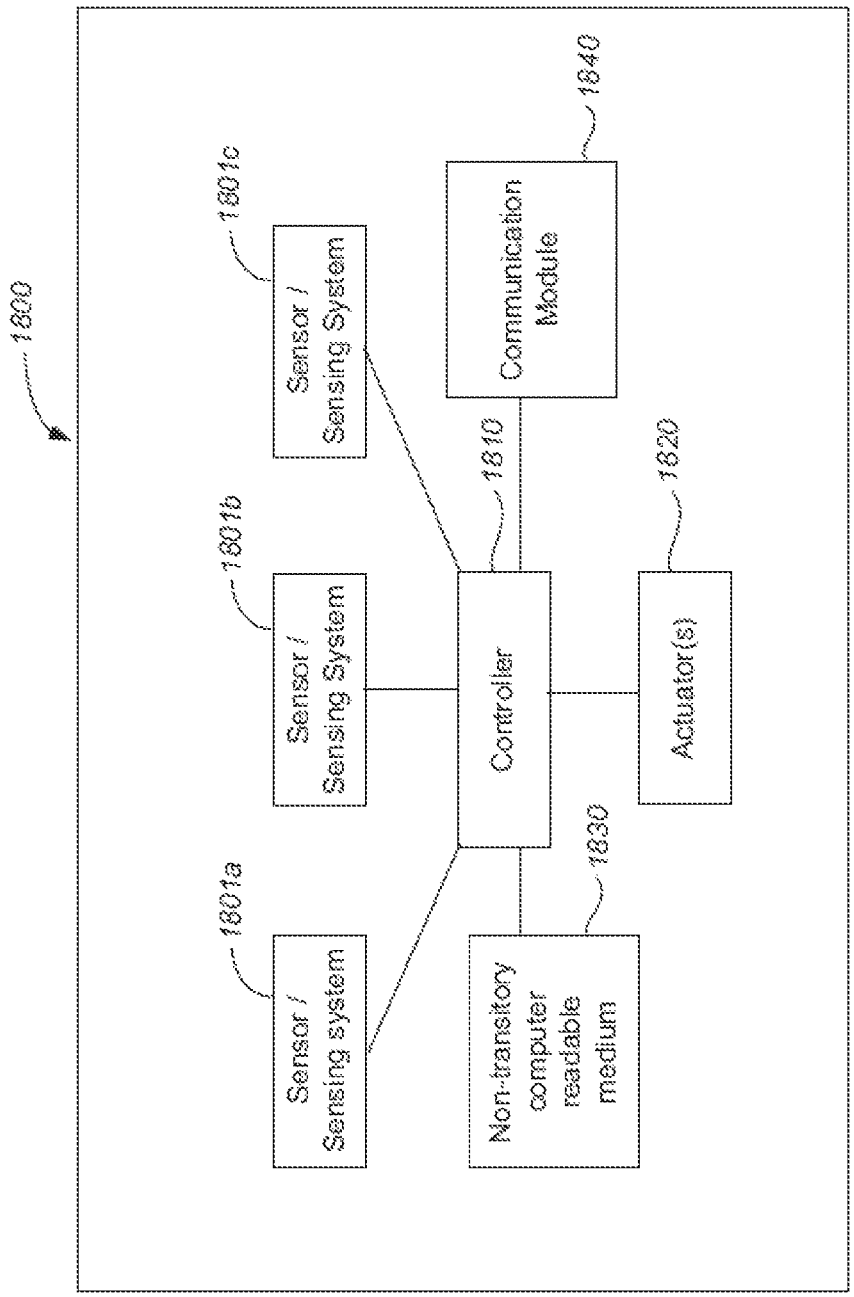
FIG. 18 illustrates exemplary components of a system used to implement the present invention, in accordance with an embodiment.

FIG. 18 illustrates exemplary components of a system 1800 used to implement the present invention, in accordance with an embodiment. As illustrated, the system 1800 includes a controller 1810 operatively coupled to one or more sensors or sensing systems 1801a-c via a wired or wireless connection. For example, the sensors may be connected to the controller via a controller area network (CAN). The controller 1810 can also be operatively coupled to one or more actuators 1820 for controlling the state of the UAV.

The sensors may include any sensors discussed herein, such as inertial sensor, GPS receiver, compass, magnetometer, altimeter, proximity sensor (e.g., infrared sensor or LIDAR sensor), visual or image sensor (such as a camera or video camera), photo sensor, motion detector, touch sensor, pressure sensor, temperature sensor, photosensor, magnetic sensor, and the like.

In some embodiments, some sensors (such as visual sensors) may be optionally coupled to a field programmable gate array (FPGA, not shown). The FPGA can be operatively coupled to the controller (e.g., via a general purpose memory controller (GPMC) connection). In some embodiments, some sensors (such as visual sensors) and/or the FPGA can be optionally coupled to a transmission module. The transmission module can be used to transmit data captured by the sensors (e.g., image data) to any suitable external device or system, such as a terminal or remote device as described herein.

The controller can include one or more programmable processors (e.g., a central processing unit (CPU)). The controller can be operatively coupled to a non-transitory computer readable medium 1830. The non-transitory computer readable medium can include one or more memory units (e.g., removable media or external storage such as an SD card, random access memory (RAM)). In some embodiments, data from the sensors (e.g., camera) can be directly conveyed to and stored within the memory units of the non-transitory computer readable medium (e.g., through a direct memory access (DMA) connection). The memory units of the non-transitory computer readable medium can include code and/or program instructions executable by the controller to perform any suitable embodiment of the methods described herein. For example, the controller can be configured to execute instructions causing one or more processors of the controller to analyze data produced by one or more sensors or sensing systems to determine positional and/or motion information of the UAV, the detected external contact information, and/or the detected external signal information, as described herein. As another example, the controller can be configured to execute instructions causing one or more processors of the controller to determine whether the autonomously launch or land the UAV.

The memory units of the non-transitory computer readable medium 1830 store sensor data from the one or more sensing systems to be processed by the controller. In some embodiments, the memory units of the non-transitory computer readable medium can store the positional and/or motion information of the UAV, the detected external contact information, and/or the detected external signal information. Alternatively or in combination, the memory units of the non-transitory computer readable medium can store predetermined or pre-stored data for controlling the UAV (e.g., a-predetermined threshold values for sensor data, parameters for controlling the actuators, predetermined flight path, velocity, acceleration or orientation of the UAV).

As discussed above, the controller 1810 can be used to adjust the state of the UAV via one or more actuators 1820. For example, the controller may be used to control the rotors of the UAV (e.g., rotational speed of the rotors) so as to adjust the spatial disposition of the UAV or a component thereof (e.g., a payload, a carrier of the payload) with respect to up to six degrees of freedom (three translational movement (along the X, Y and Z axes) and three rotational movement (along the roll, pitch and yaw axes)). Alternatively or in combination, the controller can be configured to adjust the velocity or acceleration of the UAV with respect to six degrees of freedom. In some embodiments, the controller can control the UAV based on predetermined control data or positional, external contact or external signal information for the UAV obtained by processing data from one or more sensing systems, as described herein. For example, the controller may provide acceleration or deceleration signals to the actuators based on the determination of whether launching or landing is required.

In various embodiments, the actuators can include an electric motor, mechanical actuator, hydraulic actuator, pneumatic actuator, and the like. Electric motors can include magnetic, electrostatic, or piezoelectric motors. For example, in an embodiment, the actuator includes a brushed or brushless DC electric motor.

The controller can be operatively coupled to a communication module 1840 configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, peer-to-peer (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensor data from the sensing systems, positional and/or motion information, external contact information and/or external signal information determined by processing the sensor data, predetermined control data, user commands from a terminal or remote controller, and the like.

The components of the system can be arranged in any suitable configuration. For example, one or more of the components of the system can be located on the UAV, carrier, payload, terminal, sensing system, or any other remote device or system in communication with one or more of the above. Additionally, although FIG. 18 depicts a single controller and a single non-transitory computer readable medium, one of skill in the art would appreciate that this is not intended to be limiting, and that the system can include a plurality of controllers and/or non-transitory computer readable media. In some embodiments, one or more of the plurality of controllers and/or non-transitory computer readable media can be situated at different locations, such as on the UAV, carrier, payload, terminal, sensing system, or any other remote device or system in communication with one or more of the above, or suitable combinations thereof, such that any suitable aspect of the processing and/or memory functions performed by the system can occur at one or more of the aforementioned locations.

[The subject UAVs, alone or for operation in the context of a system as disclosed herein, include without limitation single-rotor aircraft, multi-rotor aircraft, and rotary-wing aircraft. Rotary-wing aircraft typically utilizes lift generated by rotor blades, which revolve around a mast or shaft. Examples of such rotorcrafts may include helicopters, cyclocopters, autogyros, gyrodynes, and the like. Such rotorcrafts may have more than one rotor fixed about the craft in more than one location. For example, the subject UAVs may include quadcopters, hexacopters, octocopters, and the like.

In various embodiments, the UAVs may move freely with respect to up to six degrees of freedom (e.g., three degrees of freedom in translation and three degrees of freedom in rotation). Alternatively, the movement of the UAV may be constrained with respect to one or more degrees of freedom, such as by a predetermined path or track. The movement can be actuated by any suitable actuation mechanism, such as an engine or a motor. In some embodiments, the UAV may be driven by a propulsion system. Examples of propulsion systems may include engines, motors, wheels, axles, magnets, rotors, propellers, blades, nozzles, or any suitable combination thereof. The movement of the UAV may be powered by any suitable energy source, such as electrical energy, magnetic energy, solar energy, wind energy, gravitational energy, chemical energy, nuclear energy, or any suitable combination thereof.

In various embodiments, the subject UAVs may adopt different sizes, dimensions and/or configurations. For example, in an embodiment, the subject UAVs may be multi-rotor UAVs where the distance between the shafts of opposing rotors does not exceed a certain threshold value. Such threshold value may be around 5 meters, 4 meters, 3, meters, 2 meters, 1 meter, or the like. For instances, the values of the distance between shafts of opposing rotors may be 350 millimeters, 450 millimeters, 800 millimeters, 900 millimeters and the like.

In some embodiments, the UAV may be of a size and/or dimensions sufficient to accommodate a human occupant within or on the UAV. Alternatively, the UAV may be of size and/or dimensions smaller than that capable of having a human occupant within or on the UAV. In some instances, the UAV may have a maximum dimension (e.g., length, width, height, diameter, diagonal) of no more than 5 m, 4 m, 3 m, 2 m, 1 m, 0.5 m, or 0.1 m. For example, the distance between shafts of opposing rotors may be no more than 5 m, 4 m, 3 m, 2 m, 1 m, 0.5 m, or 0.1 m. In some embodiments, the UAV may have a volume of less than 100 cm×100 cm×100 cm. In some embodiments, the UAV may have a volume of less than 50 cm×50 cm×30 cm. In some embodiments, the UAV may have a volume of less than 5 cm×5 cm×3 cm. In some embodiments, the UAV may have a footprint (which may refer to the lateral cross-sectional area encompassed by the UAV) less than about 32,000 cm$^2$, less than about 20,000 cm$^2$, less than about 10,000 cm$^2$, less than about 1,000 cm$^2$, less than about 500 cm$^2$, less than about 100 cm$^2$ or even less. In some instances, the UAV may weigh no more than 1000 kg, no more than 500 kg, no more than 100 kg, no more than 10 kg, no more than 5 kg, no more than 1 kg, or no more than 0.5 kg.

In various embodiments, the UAV may be configured to carry a load. The load can include one or more of cargo, equipment, instruments, and the like. The load can be provided within a housing. Alternatively, portions of the load or the entire load can be provided without a housing. The load can be rigidly fixed relative to the UAV. Alternatively, the load can be movable relative to the UAV (e.g., translatable or rotatable relative to the UAV).

In some embodiments, the load includes a payload 708 and a carrier 709 for the payload. The carrier can be integrally formed with the UAV. Alternatively, the carrier can be releasably coupled to the UAV. The carrier can be coupled to the UAV directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the UAV. For example, the carrier can be configured to move relative to the UAV (e.g., with respect to one, two, or three degrees of translation and/or one, two, or three degrees of rotation) such that the payload maintains its position and/or orientation relative to a suitable reference frame regardless of the movement of the UAV. The reference frame can be a fixed reference frame (e.g., the surrounding environment). Alternatively, the reference frame can be a moving reference frame (e.g., the UAV, a payload target).

In some embodiments, the carrier can be configured to permit movement of the payload relative to the carrier and/or UAV. The movement can be a translation with respect to up to three degrees of freedom (e.g., along one, two, or three axes) or a rotation with respect to up to three degrees of freedom (e.g., about one, two, or three axes), or any suitable combination thereof. For example, the carrier can include a frame assembly and an actuation assembly. The frame assembly can provide structural support to the payload. The frame assembly can include individual frame components, some of which can be movable relative to one another.

The frame assembly and/or its individual components can be coupled to an actuation assembly that facilitates the movement of the frame assembly. The actuation assembly can include one or more actuators (e.g., motors) that actuate movement of the individual frame components. The actuators can permit the movement of multiple frame components simultaneously, or may be configured to permit the movement of a single frame component one at a time. The movement of the frame components can produce a corresponding movement of the payload. For example, the actuation assembly can actuate a rotation of one or more frame components about one or more axes of rotation (e.g., roll axis, pitch axis, or yaw axis). The rotation of the one or more frame components can cause a payload to rotate about one or more axes of rotation relative to the UAV. Alternatively or in combination, the actuation assembly can actuate a translation of one or more frame components along one or more axes of translation, and thereby produce a translation of the payload along one or more corresponding axes relative to the UAV.

The payload can be coupled to the UAV via the carrier, either directly (e.g., directly contacting the UAV) or indirectly (e.g., not contacting the UAV). Optionally, the payload can be mounted on the UAV without requiring a carrier. The payload can be integrally formed with the carrier. Alternatively, the payload can be releasably coupled to the carrier. In some embodiments, the payload can include one or more payload elements, and one or more of the payload elements can be movable relative to the UAV and/or the carrier, as described above. The payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensor data (e.g., a photograph) or dynamic sensor data (e.g., a video). In some embodiments, the sensor provides sensor data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the UAV.

FIG. 1 illustrates an example UAV 100 that may be used to implement the present invention, in accordance with an embodiment of the present invention. The unmanned aerial vehicle 100 can include a propulsion system having one or more rotors 102. Any number of rotors may be provided (e.g., one, two, three, four, five, six, or more). The rotors may be configured to be rotatably coupled to respective rotor blades 101. When in use, the rotors can cause the rotor blades to rotate around the rotation mast or shaft at the same or different speed thereby causing the UAV to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m.

In some embodiments, the UAV may include a body 104 that may be used to house or carry various components of the UAV such as electrical components. Such components may be carried inside the body or on the outer surface of the body. Examples of components carried by the body may include flight control units, processors, circuit boards, actuators such as motors, communication units, sensors and the like.

In some embodiment, the body of the UAV may have attached thereto one or more extension members 103. The extension members may include a support member that is adapted to support, in whole or in part, weight of the UAV when the UAV is not airborne. For example, the support member may include a landing stand such as illustrated in FIG. 1. The landing stand may form a rectangular shape or a similarly shaped structure configured to withstand external forces exerted, for example, during landing.

In some embodiments, the extension members 103 may be configured to be touched, grasped or otherwise contacted by an external object such as a human hand, a robotic arm, and the like. In some embodiments, such contact may be detected by the UAV (e.g., via a touch sensor located on the extension member). In response to the detected external contact, the UAV may autonomously cause the deceleration of the UAV. For example, detected external contact may be received by a controller of the UAV that generates a decelerating signal to one or more actuators (motors) associated with the rotors thereby causing the rotors (and hence associated rotor blades) to slow down, stall and/or come to a complete stop.

In various embodiments, the UAV may carry onboard one or more sensors 105 and 106. Examples of the sensors may include but not limit to an inertial sensor, GPS receiver, compass, magnetometer, altimeter, infrared sensor, visual or image sensor (such as a camera or video camera), photo sensor, audio sensor (e.g., microphone), motion detector, touch sensor, pressure sensor, temperature sensor, magnet, and the like.

In various embodiments, the onboard sensors may be located at any suitable locations on the UAV. For example, some sensors 105 may be located on the outer surface of the body of the UAV or inside the body. As another example, some sensors 106 may be located on an extension member coupled to the body of the UAV.

The onboard sensors may be used for a variety of purposes. For example, the sensors may be used for surveillance, surveys, photography, search and rescue, remote sensing, sample collection, scientific research, and the like. In some embodiments, some of the sensors may be used to facilitate the launching and/or landing of the UAV using techniques described herein. For example, the sensors (e.g., inertial sensor, GPS receiver and/or visual sensor) may be used to detect a positional change of the UAV (including translational or rotational changes such as change in location, velocity, acceleration, and/or orientation). As another example, the sensors (e.g., visual sensor, audio sensor, or motion detector) may be used to detect an external signal such as a visual signal, a voice command, a gesture or movement of an object such as a body part. Such detected positional change and/or external signal may be used to by the UAV as a signal to autonomously start launching the UAV, for example, by causing the start and/or the acceleration of the rotors (and hence the rotation of the rotor blades) to generate the lift necessary to cause the UAV to gain or maintain elevation. In some embodiments, the launching of the UAV as described above may be based on input from one, two, three or more of the sensors discussed herein.

As another example, the sensors (e.g., touch sensor, pressure sensor, photo sensor, motion sensor) may be used to detect an external contact with the UAV while the UAV is airborne. Based on the detected external contact, the UAV may autonomously cause the deceleration of the rotors (and the associated rotor blades). For example, a controller of the UAV may receive the detected external contact and generate one or more deceleration or stall signals to one or more actuators (e.g., motors) causing the rotor blades to slow down or stop rotating. Instead of or in addition to external contact, positional change and/or external signals (audio/visual/movement) such as discussed above may be detected by the UAV and used as signals to engage in the autonomous landing as discussed herein.

In some embodiments, some or all of the sensors discussed herein may be located off board. Such sensors may be located in an environment where the UAV operates. For example, the sensors may be mounted on or carried by interior walls of a room (e.g., when the UAV operates indoor), buildings, trees or other fixed structures (e.g., when the UAV operates outdoors), and/or movable objects. The movable object may include a vehicle, such as an aerial vehicle, a water vehicle, a ground vehicle, a space vehicle, or any combination thereof. In some embodiments, the movable object can be a living subject, such as a human or an animal.

As discussed above, a UAV may be capable of engaging in automatic landing operations based on detected external contact with the UAV. To facilitate such external contact, in some embodiments, the UAV may be provided with a holding member or structure configured to be touched, grasped, or otherwise contacted by or engage with an external object. In some embodiments, such a holding member may include a structure that also provides other functionalities. For example, the landing leg 103 such as illustrated in FIG. 1 can be configured to be graspable by a human or robotic hand. In other words, the landing leg is a holding member. At the same time, the landing leg 103 can also be used to support, in whole or in part, the weight of the UAV on a surface when the UAV. Thus, the holding member can also be used for other purposes (e.g., landing support). In other embodiments, the holding member may include a structure that is provided for the sole purpose of being contacted by an external object.

In various embodiments, the holding members may include a handle, clasp, rod, rope, leg, stand, structural extension, cavity, hole, bump, magnet, hook, loop, or the like, or any combination thereof. FIGS. 2-6 illustrate some example UAVs with such holding members, in accordance with some embodiments. In some embodiments, the size, shape and dimension of the holding members may be adapted to be held, grasped, gripped or touched by a human hand, a mechanical arm or hand, or any other suitable grasping or gripping device or structure. In some embodiments, a holding member may be located relative to the UAV such that the holding member is held or touched by a hand or device, there is sufficient distance between the hand or device and the one or more rotor blades of the UAV or any other part of the UAV that may cause injury or damage to hand or device. In some embodiments, the holding members may include one or more sensors for detecting external contact. Such sensors may include, for example, a touch sensor, temperature sensor, pressure sensor, photo sensor, visual sensor, or any combination thereof. In some embodiments, some or all of such sensors may be embedded in the holding members, located on other portions of the UAV, and/or off of the UAV. The sensors may be configured to communicate with a controller of the UAV using wired or wireless communication methods.

Figure 2:
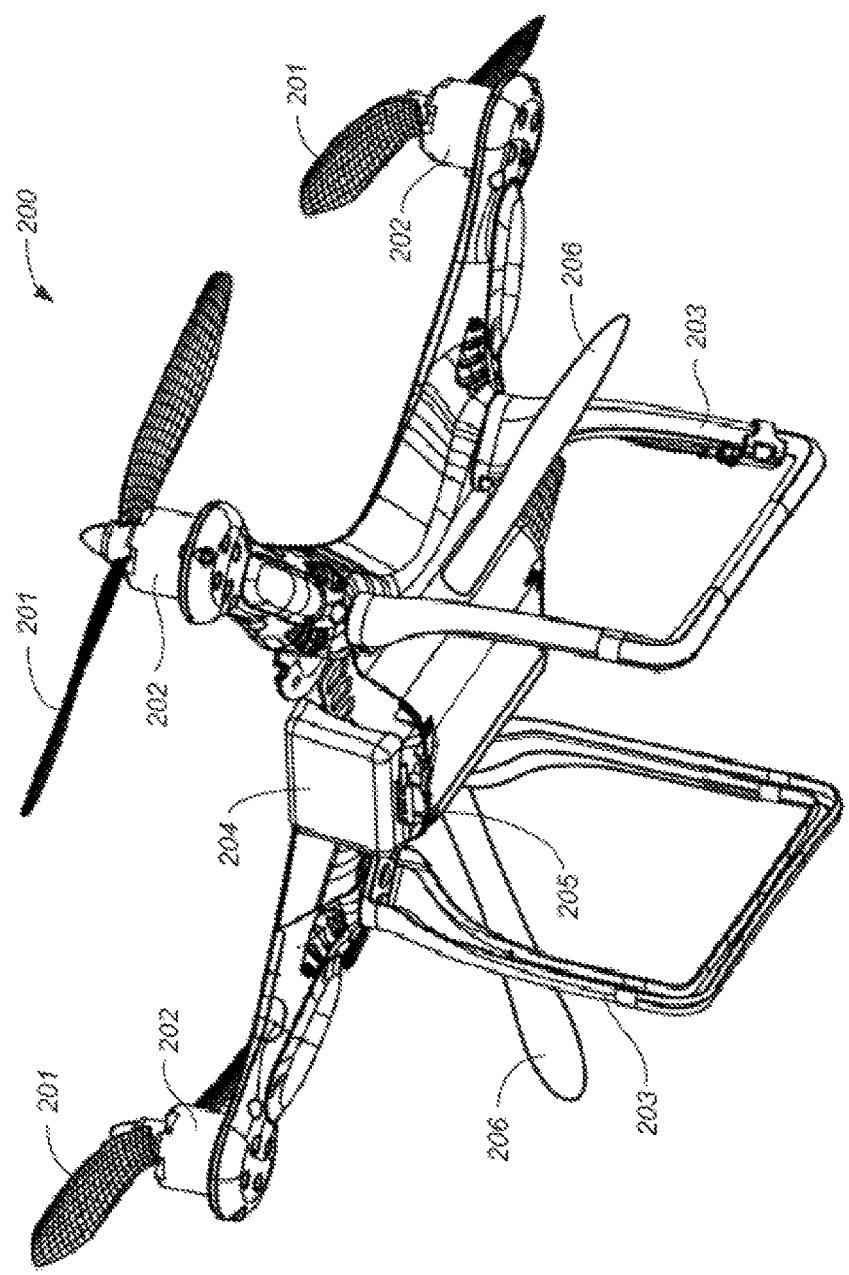
FIG. 2 illustrates another exemplary UAV that may be used to implement the present invention, in accordance with an embodiment of the present invention.

FIG. 2 illustrates another example UAV 200, in accordance with an embodiment of the present invention. The UAV 200 may be similar to the UAV 100 described in connection with FIG. 1. For example, the UAV 200 may include rotors 200, rotor blades 201, body 204, sensors 205 and landing stands 203 that are similar to the corresponding components in the UAV 100 of FIG. 1. However, unlike the UAV 100, the UAV 200 also includes one or more holding rods or handles 206 that may be held or contacted (e.g., by a human hand or a mechanical device) to facilitate the automatic landing discussed herein. The holding rods may extend outward or radiate from the side of the body of the UAV. The holding members of the UAV may include the holding rods 206 and optionally the landing stands 203.

Figure 3:
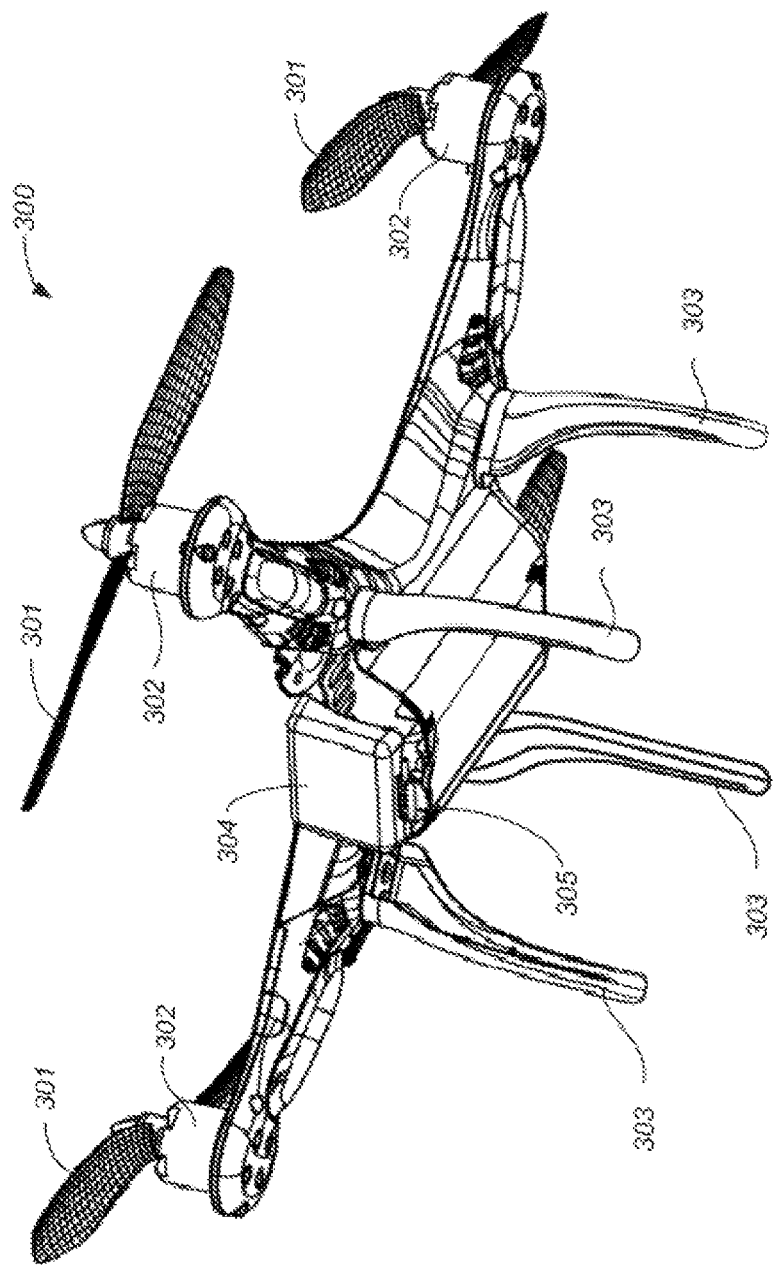
FIG. 3 illustrates another exemplary UAV that may be used to implement the present invention, in accordance with an embodiment of the present invention.

FIG. 3 illustrates another example UAV 300, in accordance with an embodiment of the present invention. The UAV 300 may be similar to the UAVs 100 and 200 described in connection with FIGS. 1-2. However, instead of landing stands 203 or holding rods 206, the UAV 300 includes one or more substantially vertical holding legs 303 that may be held or contacted (e.g., by a human hand or a mechanical device) to facilitate the automatic landing discussed herein. In some embodiments, the holding legs 303 may optionally function as landing legs for supporting the weight of the UAV, in whole or in part, on a surface when the UAV is not airborne.

Figure 4:
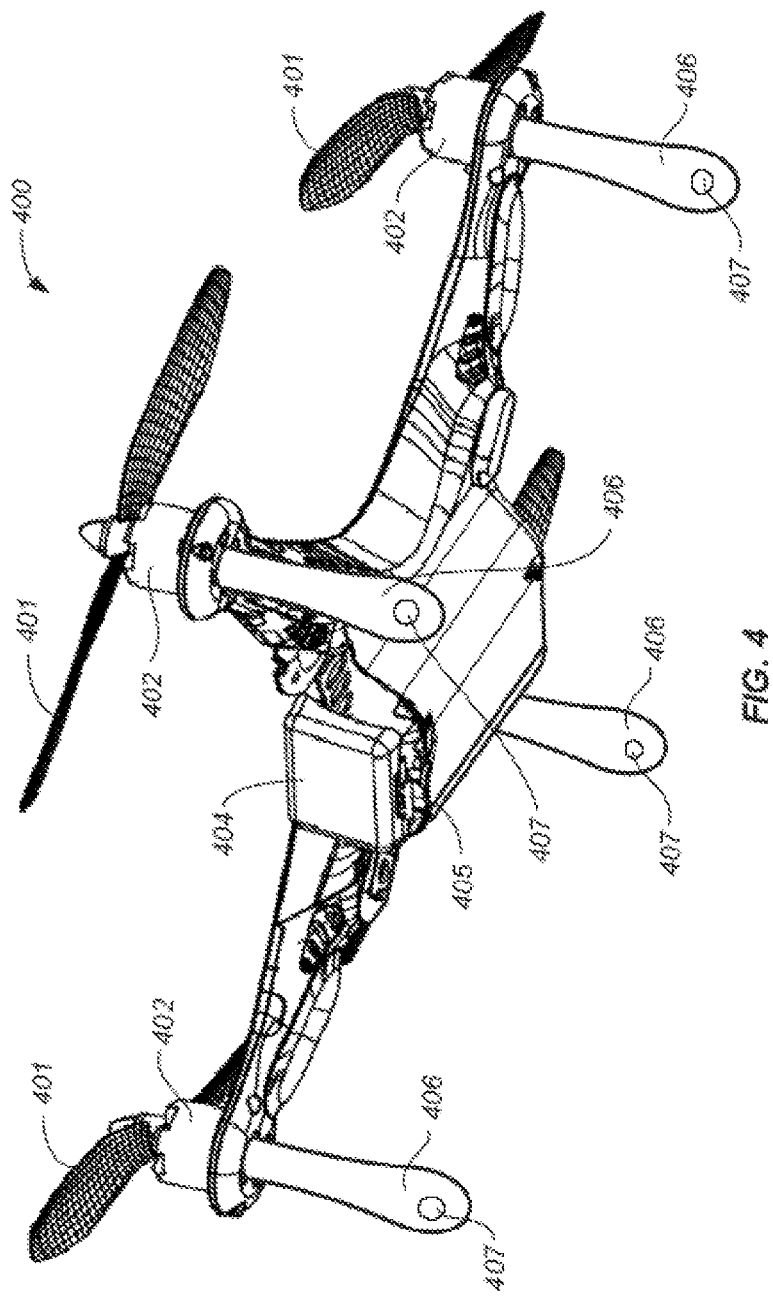
FIG. 4 illustrates another exemplary UAV that may be used to implement the present invention, in accordance with an embodiment of the present invention.

FIG. 4 illustrates another example UAV 400, in accordance with an embodiment of the present invention. The UAV 400 may be similar to the UAV 300 described above in connection with FIG. 3. For example, UAV 400 includes four substantially vertical holding rods 406. The holding rods may be held or contacted (e.g., by a human hand or a mechanical device) to facilitate the automatic landing discussed herein. Each of the holding rods 406 may include a sensor 407 for detecting external contact with the rod. As discussed above, such a sensor may include a touch sensor, temperature sensor, pressure sensor, photo sensor, visual sensor, or any combination thereof. Furthermore, the locations of the holding rods 406 relative to the UAV may be different than those for the holding legs 304. For example, the holding rods 406 may be located further apart and/or directly below each of the rotors of the UAV whereas the holding legs 306 may be located closer apart and/or below the body of the UAV. In some embodiments, the holding rods 406 may optionally function as landing legs for supporting the weight of the UAV, in whole or in part, on a surface when the UAV is not airborne.

Figure 5:
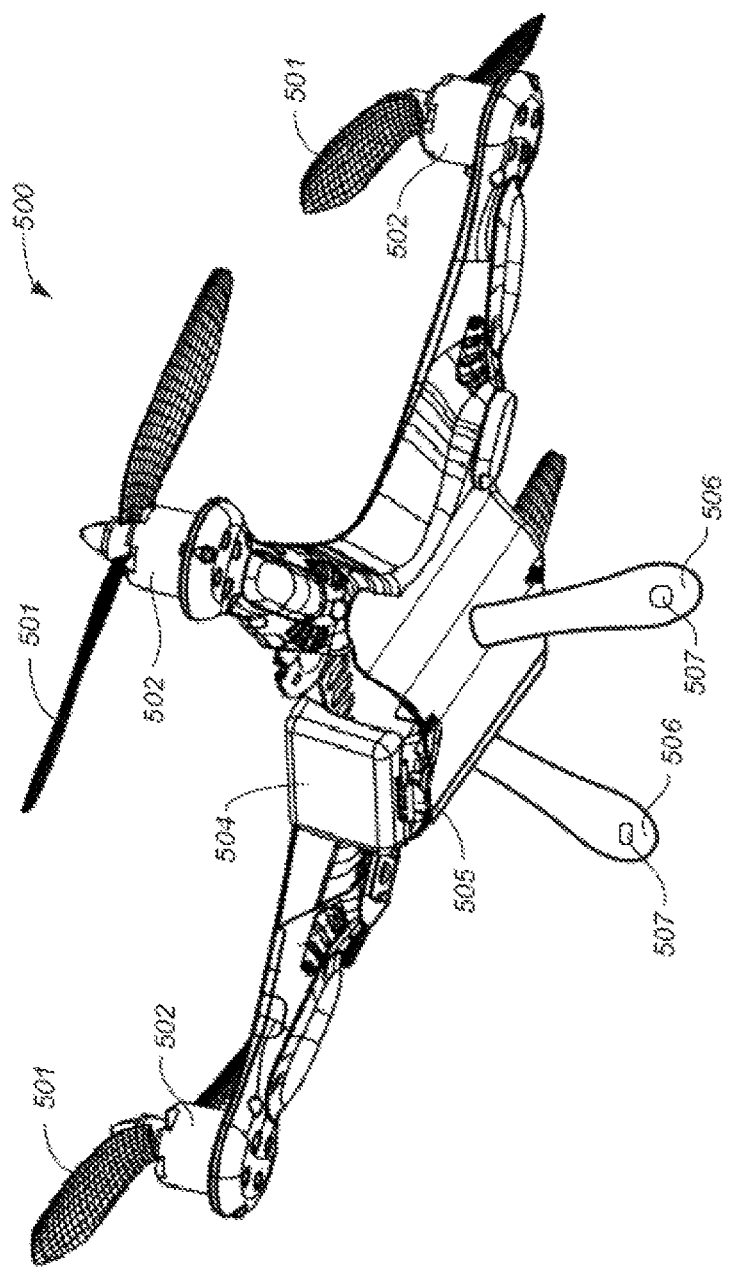
FIG. 5 illustrates another exemplary UAV that may be used to implement the present invention, in accordance with an embodiment of the present invention.

FIG. 5 illustrates another example UAV 500, in accordance with an embodiment of the present invention. The UAV 500 may be similar to the UAV 400 described above in connection with FIG. 4. However, instead of four substantially vertical holding rods, the UAV 500 may include only two holding rods 506 that extend from the body of the UAV in a bipod fashion. Each of the holding rods 506 may include a sensor 507 for detecting external contact with the rod such as discussed above. In some embodiments, any suitable number of holding rods may be provided. For example, the UAV may include one, two, three, four, five or more holding rods.

Figure 6:
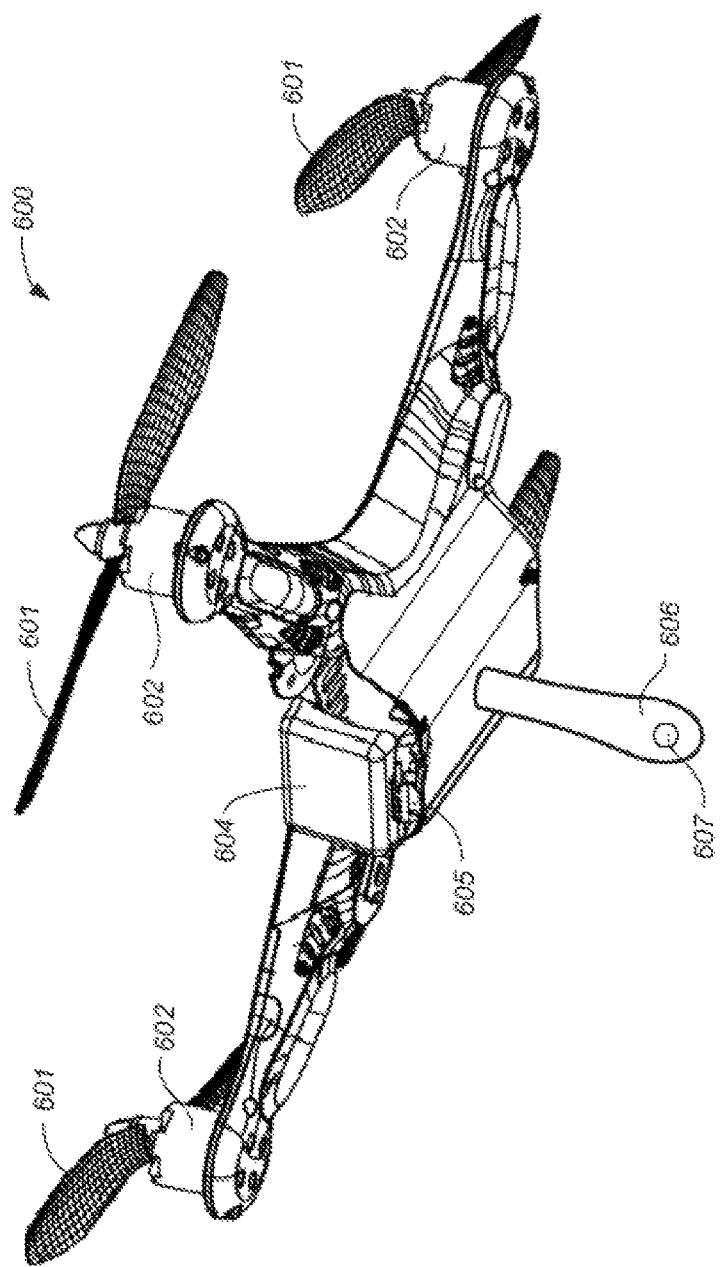
FIG. 6 illustrates another exemplary UAV that may be used to implement the present invention, in accordance with an embodiment of the present invention.

FIG. 6 illustrates another example UAV 600, in accordance with an embodiment of the present invention. The UAV 600 may be similar to the UAV 500 described above in connection with FIG. 5. However, instead of two bipod-like holding rods, the UAV 600 may include only one holding rod 606 that extends substantially perpendicularly from the body of the UAV. The holding rod 606 may include a sensor 607 for detecting external contact with the rod such as discussed above. In various embodiments, a UAV may have any combination of the holding members discussed herein or variations thereof. For example, in an embodiment, the UAV may have three holding members, two extending from the side of the body of the UAV such as illustrated in FIG. 2 and one extending directly below the body such as illustrated in FIG. 6.

Figure 7:
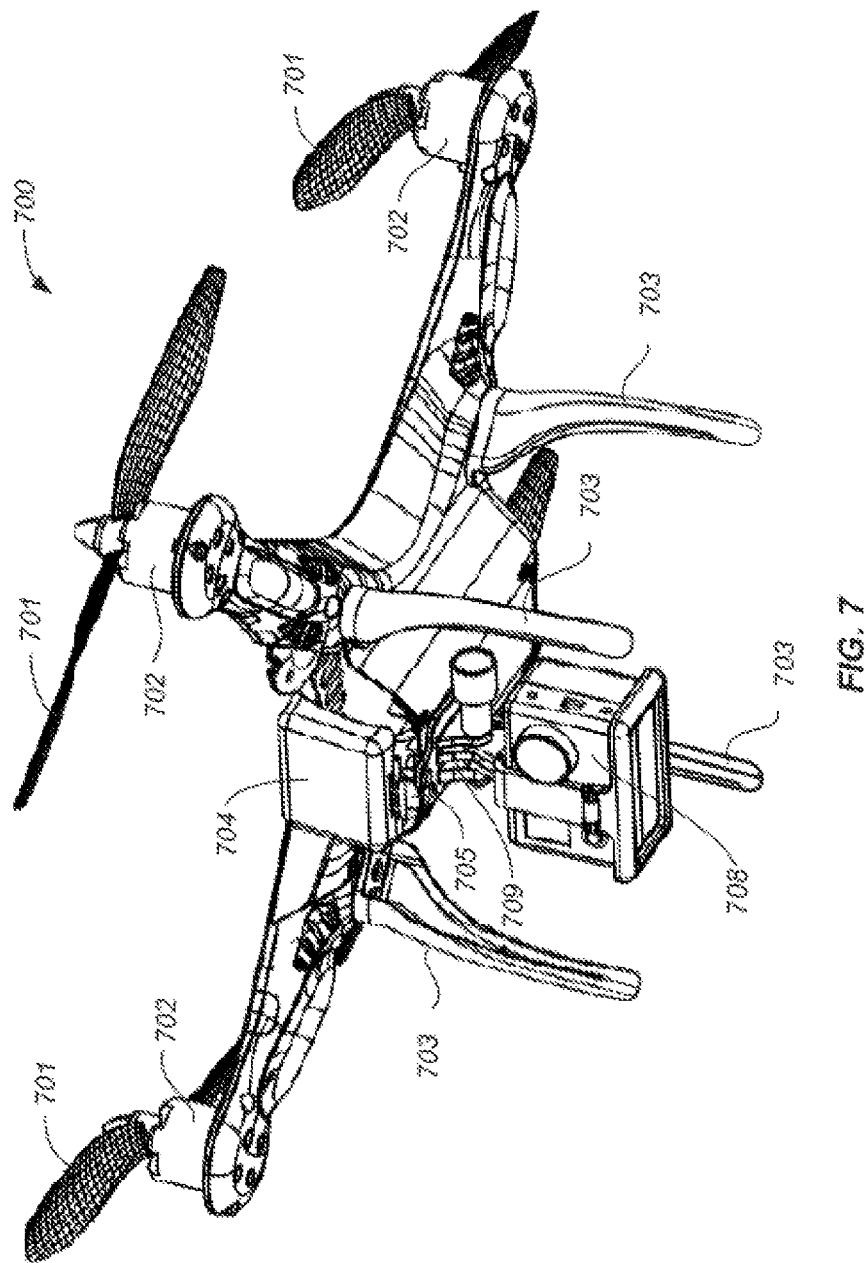
FIG. 7 illustrates another exemplary UAV that may be used to implement the present invention, in accordance with an embodiment of the present invention.

FIG. 7 illustrates another example of a UAV of the present invention. UAV 700 that may be used to implement the present invention, in accordance with an embodiment of the present invention. The UAV 700 is similar to the UAV 300 described in connection with FIG. 3. However, as illustrated, the UAV is also configured to carry a load. The load may include a payload 708 and a carrier 709 for the payload. The carrier can be integrally formed with the UAV. Alternatively, the carrier can be releasably coupled to the UAV. The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the UAV. In some embodiments, the carrier can be configured to permit movement of the payload relative to the carrier and/or UAV. The movement can be a translation with respect to up to three degrees of freedom (e.g., along one, two, or three axes) or a rotation with respect to up to three degrees of freedom (e.g., about one, two, or three axes), or any suitable combination thereof. For example, the carrier can include a frame assembly and an actuation assembly. The frame assembly can provide structural support to the payload. The frame assembly can include individual frame components, some of which can be movable relative to one another. The actuation assembly can include one or more actuators (e.g., motors) that actuate movement of the individual frame components. The actuators can permit the movement of multiple frame components simultaneously, or may be configured to permit the movement of a single frame component at a time. The movement of the frame components can produce a corresponding movement of the payload. For example, an actuation assembly can actuate a rotation of one or more frame components about one or more axes of rotation (e.g., roll axis, pitch axis, or yaw axis). The rotation of the one or more frame components can cause a payload to rotate about one or more axes of rotation relative to the UAV. Alternatively or in combination, the actuation assembly can actuate a translation of one or more frame components along one or more axes of translation, and thereby produce a translation of the payload along one or more corresponding axes relative to the UAV.

In some embodiments, a UAV may be small relative to the load (comprising payload device and/or carrier). In some examples, a ratio of a UAV weight to a load weight may be greater than, less than, or equal to about 1:1. In some instances, a ratio of a UAV weight to a payload weight may be greater than, less than, or equal to about 1:1. Where desired, the a ratio of a UAV weight to a load weight may be 1:2, 1:3, 1:4, or even less. Conversely, the ratio of a UAV weight to a load weight can also be designed to 2:1, 3:1, 4:1, 5:1 or even higher. Optionally, a ratio of a carrier weight to a payload weight may be greater than, less than, or equal to about 1:1. Where desired, the ratio of carrier's weight to payload's weight may 1:2, 1:3, 1:4, or even less. Conversely, the ratio of carrier's weight to payload's weight may 2:1, 3:1, 4:1, 5:1, or even higher. In some embodiments, the UAV may have low energy consumption. For example, the UAV may use less than 2 w/h. In some instances, the carrier may have low energy consumption. For example, the carrier may use less than 2 w/h.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV), comprising:
   one or more rotor blades;
   one or more holding members attached to a body of the UAV, wherein the one or more holding members are configured to be held by a human hand;
   one or more sensors configured to detect a positional change of the UAV caused by a release of the human hand from the one or more holding members; and
   one or more processors on-board the UAV configured to provide an actuation signal in response to the detected positional change caused by the release of the human hand from the one or more holding members, wherein the actuation signal is configured to direct the UAV to generate a lift and/or thrust to maintain the UAV in an airborne state.

2. The UAV of claim 1, wherein the actuation signal is configured to cause the UAV to hover.

3. The UAV of claim 1, wherein the one or more holding members are further configured to be used as a landing support for the UAV.

4. The UAV of claim 1, wherein the positional change comprises a change in orientation of the UAV.

5. The UAV of claim 1, wherein the positional change comprises a change in velocity or a change in acceleration of the UAV.

6. The UAV of claim 5, wherein the one or more processors are configured to provide the actuation signal in response to a detected change in a vertical velocity of the UAV to close to zero.

7. The UAV of claim 1, wherein the positional change comprises a change in location of the UAV with respect to a reference object.

8. The UAV of claim 1, wherein the one or more sensors comprise an inertial sensor, GPS receiver, compass, magnetometer, altimeter, or infrared sensor, or a visual sensor.

9. The UAV of claim 1, wherein the one or more processors are further configured to analyze the positional change of the UAV detected by the one or more sensors.

10. The UAV of claim 9, wherein the analysis comprises comparing the positional change of the UAV against a threshold or a predetermined value.

11. The UAV of claim 10, wherein the one or more processors are configured to provide the actuation signal when the positional change of the UAV has reached the threshold or predetermined value.

12. An unmanned aerial vehicle (UAV), comprising:
    one or more rotor blades;
    one or more holding members attached to a body of the UAV, wherein the one or more holding members are configured to be held by a human hand;
    one or more sensors configured to detect a release of the one or more holding members by the human hand, or a freefall motion or state of the UAV; and
    one or more processors on-board the UAV configured to provide an actuation signal in response to the detected release, or in response to the detected freefall motion or state of the UAV, wherein the actuation signal is configured to direct the UAV to generate a lift and/or thrust to maintain the UAV in an airborne state.

13. The UAV of claim 12, wherein the one or more holding members are further configured to be used as a landing support for the UAV.

14. The UAV of claim 12, wherein the one or more sensors are provided on the one or more holding members.

15. The UAV of claim 14, wherein the one or more sensors comprise a touch sensor, a pressure sensor, or a temperature sensor.

16. The UAV of claim 12, wherein the actuation signal is configured to cause the UAV to hover.

17. The UAV of claim 12, wherein the one or more sensors are further configured to detect contacting of the UAV by a human hand.

18. The UAV of claim 17, wherein the one or more processors are configured to decelerate or stop rotation of the one or more rotor blades in response to the detected contact of the UAV by the human hand.

19. The UAV of claim 18, wherein the one or more processors are configured to decelerate or stop rotation of the one or more rotor blades in response to the detected contact of the UAV by the human hand after the contact is sustained for a predetermined time period.

20. The UAV of claim 19, wherein the predetermined time period is equal to or less than 1 second.

* * * * *